United States Patent
Nitta et al.

(10) Patent No.: US 10,271,216 B2
(45) Date of Patent: Apr. 23, 2019

(54) WIRELESS ACCESS SYSTEM

(71) Applicant: FUJITSU LIMITED, Kawasaki, Kanagawa (JP)

(72) Inventors: Daisuke Nitta, Plano, TX (US); Satoshi Yamamoto, Fuchu (JP); Hitoshi Yokoyama, Shinagawa (JP); Hiroki Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 15/482,458

(22) Filed: Apr. 7, 2017

(65) Prior Publication Data
US 2017/0215077 A1 Jul. 27, 2017

Related U.S. Application Data

(63) Continuation of application No. PCT/JP2014/078362, filed on Oct. 24, 2014.

(51) Int. Cl.
*G06Q 30/08* (2012.01)
*H04W 16/04* (2009.01)
*G06Q 50/10* (2012.01)
*H04W 16/14* (2009.01)
*H04W 24/02* (2009.01)
*H04W 48/10* (2009.01)
*H04W 84/12* (2009.01)

(52) U.S. Cl.
CPC .......... *H04W 16/04* (2013.01); *G06Q 30/08* (2013.01); *G06Q 50/10* (2013.01); *H04W 16/14* (2013.01); *H04W 24/02* (2013.01); *H04W 48/10* (2013.01); *H04W 84/12* (2013.01)

(58) Field of Classification Search
None
See application file for complete search history.

(56) References Cited

U.S. PATENT DOCUMENTS 9,432,911 B2 * 8/2016 Yan .................... H04W 16/10
2006/0013179 A1 1/2006 Yamane
(Continued)

FOREIGN PATENT DOCUMENTS

JP  2006-054849 A   2/2006
JP  2008-289056 A   11/2008
(Continued)

OTHER PUBLICATIONS

"Analysis! Gigabit Wireless LAN Latest Trend (3)", http://www.atmarkit.co.jp/ait/articles/1306/10/news008_2.html, Partial translation of the reference, as viewed Apr. 7, 2017.
(Continued)

*Primary Examiner* — Brian S Roberts
(74) *Attorney, Agent, or Firm* — Arent Fox LLP

(57) ABSTRACT

A wireless access system in which a first operator and a second operator share a predetermined band, includes a first base station belonging to the first operator, the first base station configured to transmit broadcast information indicating a priority of the first operator in the predetermined band; and a second base station belonging to the second operator, the second base station configured to perform wireless communication using a band configured based on a priority of the second operator in the predetermined band and the broadcast information transmitted by the first base station.

10 Claims, 33 Drawing Sheets

(56) References Cited

U.S. PATENT DOCUMENTS

| | | | |
|---|---|---|---|
| 2010/0216478 A1* | 8/2010 | Buddhikot | H04W 16/02 455/450 |
| 2012/0134328 A1 | 5/2012 | Gauvreau et al. | |
| 2014/0148165 A1* | 5/2014 | Serravalle | H04W 16/14 455/436 |
| 2014/0171018 A1* | 6/2014 | Elrefaey | H04W 16/04 455/406 |
| 2014/0206377 A1* | 7/2014 | Priotti | H04W 16/14 455/454 |
| 2014/0293867 A1 | 10/2014 | Horiuchi et al. | |
| 2015/0305037 A1* | 10/2015 | Zhang | H04W 72/0406 370/329 |

FOREIGN PATENT DOCUMENTS

| | | |
|---|---|---|
| JP | 2009-049904 A | 3/2009 |
| JP | 2011-008681 A | 1/2011 |
| JP | 2012-518927 A | 8/2012 |
| JP | 2013-545364 A | 12/2013 |
| JP | 2014-526817 A | 10/2014 |
| WO | WO 2013/069170 A1 | 5/2013 |

OTHER PUBLICATIONS

"Extending the benefits of LTE Advanced to unlicensed spectrum", Qualcomm Incorporated, Nov. 2013.

"Frequency allocation (Wikipedia)", http://en.wikipedia.org/wiki/Frequency_allocation, as viewed Apr. 7, 2017.

"Hotspot 2.0 (Release 1) Technical Specification", Version 1.0.0, Wi-Fi Alliance, 2012.

"Trends surrounding world spectrum auctions (1) 1990-2000", https://www.icr.co.jp/newsletter/report_tands/2009/s2009TS247_3.html, Partial translation of the reference, as viewed Apr. 7, 2017.

Partial Translation of International Search Report issued for PCT/JP2014/078362, dated Jan. 27, 2015.

* cited by examiner

| TARGET AREA | TIME PERIOD | BANDWIDTH UTILIZATION RIGHT (FREQUENCY BAND IS I BAND (MAXIMUM 20[MHz] PORTION)) | PURCHASING DETAILS (PURCHASE NECESSITY AND PRIORITY) |
|---|---|---|---|
| AREA A (LATITUDE A, LONGITUDE A) | TIME PERIOD 1 (5:00-12:00) | 10 [MHz] PORTION | |
| | | 20 [MHz] PORTION | |
| | TIME PERIOD 2 (12:00-18:00) | 10 [MHz] PORTION | |
| | | 20 [MHz] PORTION | |
| | TIME PERIOD 3 (18:00-5:00) | 10 [MHz] PORTION | |
| | | 20 [MHz] PORTION | |
| AREA B (LATITUDE B, LONGITUDE B) | TIME PERIOD 1 (5:00-12:00) | 10 [MHz] PORTION | |
| | | 20 [MHz] PORTION | |
| | TIME PERIOD 2 (12:00-18:00) | 10 [MHz] PORTION | |
| | | 20 [MHz] PORTION | |
| | TIME PERIOD 3 (18:00-5:00) | 10 [MHz] PORTION | |
| | | 20 [MHz] PORTION | |
| ⋮ | | | |
| AREA Z (LATITUDE Z, LONGITUDE Z) | TIME PERIOD 1 (5:00-12:00) | 10 [MHz] PORTION | |
| | | 20 [MHz] PORTION | |
| | TIME PERIOD 2 (12:00-18:00) | 10 [MHz] PORTION | |
| | | 20 [MHz] PORTION | |
| | TIME PERIOD 3 (18:00-5:00) | 10 [MHz] PORTION | |
| | | 20 [MHz] PORTION | |

| TARGET AREA | TIME PERIOD | BANDWIDTH UTILIZATION RIGHT (FREQUENCY BAND IS I BAND (MAXIMUM 20[MHz] PORTION)) | PURCHASING DETAILS (PURCHASE NECESSITY AND PRIORITY) |
|---|---|---|---|
| AREA A (LATITUDE A, LONGITUDE A) | TIME PERIOD 1 (5:00-12:00) | 10 [MHz] PORTION | |
| | | 20 [MHz] PORTION | PURCHASE WITH INTERMEDIATE PRIORITY |
| | TIME PERIOD 2 (12:00-18:00) | 10 [MHz] PORTION | PURCHASE WITH LOW PRIORITY |
| | | 20 [MHz] PORTION | |
| | TIME PERIOD 3 (18:00-5:00) | 10 [MHz] PORTION | PURCHASE WITH INTERMEDIATE PRIORITY |
| | | 20 [MHz] PORTION | |
| AREA B (LATITUDE B, LONGITUDE B) | TIME PERIOD 1 (5:00-12:00) | 10 [MHz] PORTION | |
| | | 20 [MHz] PORTION | PURCHASE WITH HIGH PRIORITY |
| | TIME PERIOD 2 (12:00-18:00) | 10 [MHz] PORTION | |
| | | 20 [MHz] PORTION | PURCHASE WITH INTERMEDIATE PRIORITY |
| | TIME PERIOD 3 (18:00-5:00) | 10 [MHz] PORTION | |
| | | 20 [MHz] PORTION | PURCHASE WITH LOW PRIORITY |
| ⋮ | | | |
| AREA Z (LATITUDE Z, LONGITUDE Z) | TIME PERIOD 1 (5:00-12:00) | 10 [MHz] PORTION | |
| | | 20 [MHz] PORTION | PURCHASE WITH INTERMEDIATE PRIORITY |
| | TIME PERIOD 2 (12:00-18:00) | 10 [MHz] PORTION | |
| | | 20 [MHz] PORTION | |
| | TIME PERIOD 3 (18:00-5:00) | 10 [MHz] PORTION | PURCHASE WITH LOW PRIORITY |
| | | 20 [MHz] PORTION | |

| TARGET AREA | TIME PERIOD | BANDWIDTH (FREQUENCY BAND IS I BAND) | OPERATOR UTILIZATION INFORMATION ||||
|---|---|---|---|---|---|---|
| | | | OPERATOR #1 | OPERATOR #2 | ... | OPERATOR #10 |
| AREA A (LATITUDE A, LONGITUDE A) | TIME PERIOD 1 (5:00-12:00) | 10 [MHz] | | | | LOW PRIORITY |
| | | 20 [MHz] | INTERMEDIATE PRIORITY | HIGH PRIORITY | | |
| | TIME PERIOD 2 (12:00-18:00) | 10 [MHz] | LOW PRIORITY | INTERMEDIATE PRIORITY | | LOW PRIORITY |
| | | 20 [MHz] | | | | |
| | TIME PERIOD 3 (18:00-5:00) | 10 [MHz] | INTERMEDIATE PRIORITY | LOW PRIORITY | | LOW PRIORITY |
| | | 20 [MHz] | | | | |
| AREA B (LATITUDE B, LONGITUDE B) | TIME PERIOD 1 (5:00-12:00) | 10 [MHz] | | | | |
| | | 20 [MHz] | HIGH PRIORITY | HIGH PRIORITY | | HIGH PRIORITY |
| | TIME PERIOD 2 (12:00-18:00) | 10 [MHz] | | | | LOW PRIORITY |
| | | 20 [MHz] | INTERMEDIATE PRIORITY | INTERMEDIATE PRIORITY | | |
| | TIME PERIOD 3 (18:00-5:00) | 10 [MHz] | | LOW PRIORITY | | LOW PRIORITY |
| | | 20 [MHz] | LOW PRIORITY | | | |
| ... | | | | | | |
| AREA Z (LATITUDE Z, LONGITUDE Z) | TIME PERIOD 1 (5:00-12:00) | 10 [MHz] | | | | LOW PRIORITY |
| | | 20 [MHz] | INTERMEDIATE PRIORITY | HIGH PRIORITY | | |
| | TIME PERIOD 2 (12:00-18:00) | 10 [MHz] | | | | |
| | | 20 [MHz] | | HIGH PRIORITY | | |
| | TIME PERIOD 3 (18:00-5:00) | 10 [MHz] | LOW PRIORITY | INTERMEDIATE PRIORITY | | LOW PRIORITY |
| | | 20 [MHz] | | | | |

FIG.8

| TARGET AREA | OPERATOR NAME | WIRELESS BASE STATION NAME | DESTINATION INFORMATION (IP ADDRESS) |
|---|---|---|---|
| AREA A (LATITUDE A, LONGITUDE A) | OPERATOR #1 | WIRELESS BASE STATION #1-1 | XX.YY.ZZ.01 |
| | | WIRELESS BASE STATION #1-2 | XX.YY.ZZ.02 |
| | OPERATOR #2 | WIRELESS BASE STATION #2-1 | XX.YY.ZZ.03 |
| | | WIRELESS BASE STATION #2-2 | XX.YY.ZZ.04 |
| | ⋮ | | |
| | OPERATOR #10 | WIRELESS BASE STATION #10-1 | XX.YY.ZZ.08 |
| | | WIRELESS BASE STATION #10-2 | XX.YY.ZZ.09 |
| AREA B (LATITUDE B, LONGITUDE B) | OPERATOR #1 | WIRELESS BASE STATION #1-3 | XX.YY.ZZ.11 |
| | | WIRELESS BASE STATION #1-4 | XX.YY.ZZ.12 |
| | OPERATOR #2 | WIRELESS BASE STATION #2-3 | XX.YY.ZZ.13 |
| | | WIRELESS BASE STATION #2-4 | XX.YY.ZZ.14 |
| | , | | |
| | , | | |
| | , | | |
| | OPERATOR #10 | WIRELESS BASE STATION #10-3 | XX.YY.ZZ.18 |
| | | WIRELESS BASE STATION #10-4 | XX.YY.ZZ.19 |
| ⋮ | | | |
| AREA Z (LATITUDE Z, LONGITUDE Z) | OPERATOR #1 | WIRELESS BASE STATION #1-5 | XX.YY.ZZ.21 |
| | | WIRELESS BASE STATION #1-6 | XX.YY.ZZ.22 |
| | OPERATOR #2 | WIRELESS BASE STATION #2-5 | XX.YY.ZZ.23 |
| | | WIRELESS BASE STATION #2-6 | XX.YY.ZZ.24 |
| | , | | |
| | , | | |
| | , | | |
| | OPERATOR #10 | WIRELESS BASE STATION #10-5 | XX.YY.ZZ.28 |
| | | WIRELESS BASE STATION #10-6 | XX.YY.ZZ.29 |

| INFORMATION ELEMENT | DETAILS |
|---|---|
| POSITION INFORMATION | LATITUDE : XX° XX.XX'<br>LONGITUDE : XX° XX.XX'<br>ALTITUDE: XX° XX.XX' |
| TIME INFORMATION (24-HOUR TIME NOTATION) | 6:10 |

| INFORMATION ELEMENT | DETAILS |
|---|---|
| OPERATING OPERATOR NAME | OPERATOR #1 |
| FREQUENCY BAND | I BAND |
| FREQUENCY BAND TO BE USED | 10 [MHz] (2,100-2,110 [MHz]) |
| WIRELESS TRANSMISSION POWER VALUE | 10 [dBm] |

FIG.12

| INFORMATION ELEMENT | DETAILS |
|---|---|
| COMMUNICATION TRAFFIC AMOUNT | 40 [Mbps] (BAND UTILIZATION RATE 60%) |
| TOTAL USER COUNT OF COMMUNICATING UEs | 100 USERS (SYSTEM UTILIZATION RATE 70%) |

| INFORMATION ELEMENT | DETAILS |
|---|---|
| FREQUENCY BAND | I BAND |
| FREQUENCY BAND USED | 20 [MHz] (2,100-2,120 [MHz]) |

FIG.15

| TARGET AREA | TIME PERIOD | CONFIGURATION TIME | FREQUENCY BAND TO BE USED | BANDWIDTH UTILIZATION RIGHT | CURRENT BANDWIDTH USED | OPERATOR OPERATION INFORMATION | |
|---|---|---|---|---|---|---|---|
| | | | | | | OPERATOR NAME: OPERATOR #1 | INTERMEDIATE PRIORITY, BAND UTILIZATION RATE 60%, SYSTEM UTILIZIATION RATE 70% |
| AREA A (LATITUDE A, LONGITUDE A) | TIME PERIOD 1 (5:00-12:00) | 6:00 | I BAND | 20 [MHz] | 20 [MHz](2,100-2,120 [MHz]) | | |

| TARGET AREA | TIME PERIOD | CONFIGURATION TIME | FREQUENCY BAND TO BE USED | BANDWIDTH UTILIZATION RIGHT | CURRENT BANDWIDTH USED | OPERATOR OPERATION INFORMATION | |
|---|---|---|---|---|---|---|---|
| | | | | | | OPERATOR NAME: OPERATOR #1 | INTERMEDIATE PRIORITY, BAND UTILIZATION RATE 60%, SYSTEM UTILIZATION RATE 70% |
| AREA A (LATITUDE A, LONGITUDE A) | TIME PERIOD 1 (5:00-12:00) | 6:00 | I BAND | 20 [MHz] | 20 [MHz] (2,100-2,120 [MHz]) | | |

1600

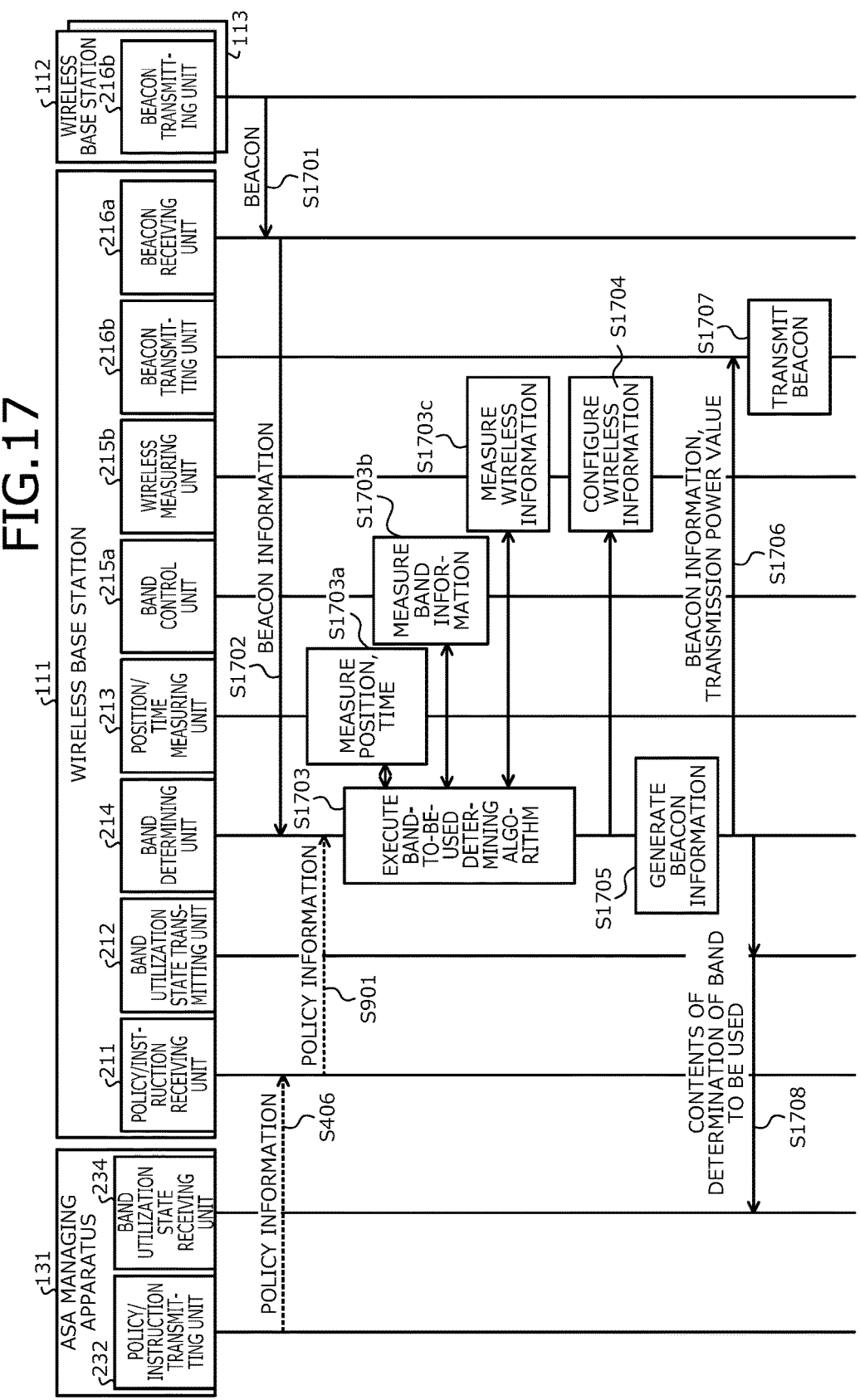

FIG.18

| TARGET AREA | TIME PERIOD | CONFIGURATION TIME | FREQUENCY BAND TO BE USED | CURRENT BANDWIDTH USED | BANDWIDTH UTILIZATION RIGHT | OPERATOR OPERATION INFORMATION | |
|---|---|---|---|---|---|---|---|
| | | | | | | OPERATOR NAME:OPERATOR #2 | OPERATOR NAME:OPERATOR #10 |
| AREA A (LATITUDE A, LONGITUDE A) | TIME PERIOD 1 (5:00-12:00) | 6:00 | I BAND | 10 [MHz] (2,100-2,110 [MHz]) | 10 [MHz] | | LOW PRIORITY, BAND UTILIZATION RATE 80%, SYSTEM UTILIZATION RATE 90% |
| | | | | 20 [MHz] (2,100-2,120 [MHz]) | 20 [MHz] | HIGH PRIORITY, BAND UTILIZATION RATE 30%, SYSTEM UTILIZATION RATE 40% | |

| INFORMATION ELEMENT | DETAILS |
|---|---|
| FREQUENCY BAND | I BAND |
| FREQUENCY BAND USED | 0 [MHz] (OFF-THE-AIR) |

FIG.21

| TARGET AREA | TIME PERIOD | CONFIGURATION TIME | FREQUENCY BAND TO BE USED | BANDWIDTH UTILIZATION RIGHT | CURRENT BANDWIDTH USED | OPERATOR OPERATION INFORMATION | |
|---|---|---|---|---|---|---|---|
| | | | | | | OPERATOR NAME: OPERATOR #1 | INTERMEDIATE PRIORITY, BAND UTILIZATION RATE 60%, SYSTEM UTILZIATION RATE 70% |
| AREA A (LATITUDE A, LONGITUDE A) | TIME PERIOD 1 (5:00-12:00) | 6:01 | I BAND | 20 [MHz] | 0 [MHz] (OFF-THE-AIR) | | |

| TARGET AREA | TIME PERIOD | CONFIGURATION TIME | FREQUENCY BAND TO BE USED | BANDWIDTH UTILIZATION RIGHT | CURRENT BANDWIDTH USED | OPERATOR OPERATION INFORMATION | |
|---|---|---|---|---|---|---|---|
| | | | | | | OPERATOR NAME: OPERATOR #1 | |
| AREA A (LATITUDE A, LONGITUDE A) | TIME PERIOD 1 (5:00-12:00) | 6:01 | I BAND | 20 [MHz] | 0 [MHz] (OFF-THE-AIR) | INTERMEDIATE PRIORITY, BAND UTILIZATION RATE 60%, SYSTEM UTILZIATION RATE 70% | |

| TARGET AREA | OPERATOR NAME | WIRELESS BASE STATION NAME | TIME PERIOD | RECEPTION TIME | FREQUENCY BAND TO BE USED | BANDWIDTH UTILIZATION RIGHT | CURRENT BANDWIDTH USED | OPERATOR OPERATION INFORMATION |
|---|---|---|---|---|---|---|---|---|
| AREA A (LATITUDE A, LONGITUDE A) | OPERATOR #1 | WIRELESS BASE STATION #1-1 | TIME PERIOD 1 (5:00-12:00) | 6:01 | I BAND | 20 [MHz] | 0 [MHz] (OFF-THE-AIR) | INTERMEDIATE PRIORITY, BAND UTILIZATION RATE 60%, SYSTEM UTILZIATION RATE 70% |
| | OPERATOR #2 | WIRELESS BASE STATION #2-1 | TIME PERIOD 1 (5:00-12:00) | 6:01 | I BAND | 20 [MHz] | 20 [MHz] (2,100-2,120 [MHz]) | HIGH PRIORITY, BAND UTILIZATION RATE 30%, SYSTEM UTILIZATION RATE 40% |
| | ⋮ | | | | | | | |
| | OPERATOR #10 | WIRELESS BASE STATION #10-1 | TIME PERIOD 1 (5:00-12:00) | 6:01 | I BAND | 10 [MHz] | 0 [MHz] (OFF-THE-AIR) | LOW PRIORITY, BAND UTILIZATION RATE 80%, SYSTEM UTILIZATION RATE 90% |
| AREA B (LATITUDE B, LONGITUDE B) | OPERATOR #1 | WIRELESS BASE STATION #1-3 | TIME PERIOD 1 (5:00-12:00) | 6:01 | I BAND | 20 [MHz] | 20 [MHz] (2,100-2,120 [MHz]) | HIGH PRIORITY, BAND UTILIZATION RATE 50%, SYSTEM UTILIZATION RATE 50% |
| | OPERATOR #2 | WIRELESS BASE STATION #2-3 | TIME PERIOD 1 (5:00-12:00) | 6:01 | I BAND | 20 [MHz] | 20 [MHz] (2,100-2,120 [MHz]) | HIGH PRIORITY, BAND UTILIZATION RATE 50%, SYSTEM UTILIZATION RATE 50% |
| | ⋮ | | | | | | | |
| | OPERATOR #10 | WIRELESS BASE STATION #10-3 | TIME PERIOD 1 (5:00-12:00) | 6:01 | I BAND | 20 [MHz] | 20 [MHz] (2,100-2,120 [MHz]) | HIGH PRIORITY, BAND UTILIZATION RATE 50%, SYSTEM UTILIZATION RATE 50% |
| ⋮ | | | | | | | | |
| AREA Z (LATITUDE Z, LONGITUDE Z) | OPERATOR #1 | WIRELESS BASE STATION #1-5 | TIME PERIOD 1 (5:00-12:00) | 6:01 | I BAND | 20 [MHz] | 0 [MHz] (OFF-THE-AIR) | INTERMEDIATE PRIORITY, BAND UTILIZATION RATE 60%, SYSTEM UTILZIATION RATE 70% |
| | OPERATOR #2 | WIRELESS BASE STATION #2-5 | TIME PERIOD 1 (5:00-12:00) | 6:01 | I BAND | 20 [MHz] | 20 [MHz] (2,100-2,120 [MHz]) | HIGH PRIORITY, BAND UTILIZATION RATE 30%, SYSTEM UTILIZATION RATE 40% |
| | ⋮ | | | | | | | |
| | OPERATOR #10 | WIRELESS BASE STATION #10-5 | TIME PERIOD 1 (5:00-12:00) | 6:01 | I BAND | 10 [MHz] | 0 [MHz] (OFF-THE-AIR) | LOW PRIORITY, BAND UTILIZATION RATE 80%, SYSTEM UTILIZATION RATE 90% |

| TARGET AREA | TIME PERIOD | CONFLICT COUNT | DETAILED INFORMATION | | |
|---|---|---|---|---|---|
| | | | FREQUENCY BAND TO BE USED | BANDWIDTH UTILIZATION RIGHT | OPERATOR OPERATION INFORMATION |
| AREA A (LATITUDE A, LONGITUDE A) | TIME PERIOD 1 (5:00-12:00) | 0 | | | |
| | ⋮ | | | | |
| AREA B (LATITUDE B, LONGITUDE B) | TIME PERIOD 1 (5:00-12:00) | 1 | I BAND | 20 [MHz] | HIGH PRIORITY, BAND UTILIZATION RATE 50%, SYSTEM UTILIZATION RATE 50% |
| | ⋮ | | | | |
| | ⋮ | | | | |
| AREA Z (LATITUDE Z· LONGITUDE Z) | TIME PERIOD 1 (5:00-12:00) | 0 | | | |
| | ⋮ | | | | |

| TARGET AREA | OPERATOR NAME | WIRELESS BASE STATION NAME | TIME PERIOD | USED BAND HISTORY | FREQUENCY BAND TO BE USED | BANDWIDTH UTILIZATION RIGHT | CURRENT BANDWIDTH USED | OPERATOR OPERATION INFORMATION |
|---|---|---|---|---|---|---|---|---|
| AREA A (LATITUDE A· LONGITUDE A) | OPERATOR #1 | WIRELESS BASE STATION #1-1 | TIME PERIOD 1 (5:00-12:00) | 0 | I BAND | 20 [MHz] | 0 [MHz] (OFF-THE-AIR) | INTERMEDIATE PRIORITY, BAND UTILIZATION RATE 60%, SYSTEM UTILZIATION RATE 70% |
| | OPERATOR #2 | WIRELESS BASE STATION #2-1 | TIME PERIOD 1 (5:00-12:00) | 1 | I BAND | 20 [MHz] | 20 [MHz] (2,100-2,120 [MHz]) | HIGH PRIORITY, BAND UTILIZATION RATE 30%, SYSTEM UTILIZATION RATE 40% |
| | ⋮ | | | | | | | |
| | OPERATOR #10 | WIRELESS BASE STATION #10-1 | TIME PERIOD 1 (5:00-12:00) | 0 | I BAND | 10 [MHz] | 0 [MHz] (OFF-THE-AIR) | LOW PRIORITY, BAND UTILIZATION RATE 80%, SYSTEM UTILIZATION RATE 90% |
| AREA B (LATITUDE B· LONGITUDE B) | OPERATOR #1 | WIRELESS BASE STATION #1-3 | TIME PERIOD 1 (5:00-12:00) | 0 | I BAND | 20 [MHz] | 0 [MHz] (OFF-THE-AIR) | HIGH PRIORITY, BAND UTILIZATION RATE 50%, SYSTEM UTILIZATION RATE 50% |
| | OPERATOR #2 | WIRELESS BASE STATION #2-3 | TIME PERIOD 1 (5:00-12:00) | 0 | I BAND | 20 [MHz] | 0 [MHz] (OFF-THE-AIR) | HIGH PRIORITY, BAND UTILIZATION RATE 50%, SYSTEM UTILIZATION RATE 50% |
| | ⋮ | | | | | | | |
| | OPERATOR #10 | WIRELESS BASE STATION #10-3 | TIME PERIOD 1 (5:00-12:00) | 1 | I BAND | 20 [MHz] | 20 [MHz] (2,100-2,120 [MHz]) | HIGH PRIORITY, BAND UTILIZATION RATE 50%, SYSTEM UTILIZATION RATE 50% |
| | ⋮ | | | | | | | |
| AREA Z (LATITUDE Z· LONGITUDE Z) | OPERATOR #1 | WIRELESS BASE STATION #1-5 | TIME PERIOD 1 (5:00-12:00) | 0 | I BAND | 20 [MHz] | 0 [MHz] (OFF-THE-AIR) | INTERMEDIATE PRIORITY, BAND UTILIZATION RATE 60%, SYSTEM UTILZIATION RATE 70% |
| | OPERATOR #2 | WIRELESS BASE STATION #2-5 | TIME PERIOD 1 (5:00-12:00) | 1 | I BAND | 20 [MHz] | 20 [MHz] (2,100-2,120 [MHz]) | HIGH PRIORITY, BAND UTILIZATION RATE 30%, SYSTEM UTILIZATION RATE 40% |
| | ⋮ | | | | | | | |
| | OPERATOR #10 | WIRELESS BASE STATION #10-5 | TIME PERIOD 1 (5:00-12:00) | 0 | I BAND | 10 [MHz] | 0 [MHz] (OFF-THE-AIR) | LOW PRIORITY, BAND UTILIZATION RATE 80%, SYSTEM UTILIZATION RATE 90% |

FIG.29

| TARGET AREA | OPERATOR NAME | WIRELESS BASE STATION NAME | TIME PERIOD | INSTRUCTION TIME | FREQUENCY BAND TO BE USED | BANDWIDTH UTILIZATION RIGHT | BANDWIDTH TO BE USED INSTRUCTION |
|---|---|---|---|---|---|---|---|
| AREA B (LATITUDE B, LONGITUDE B) | OPERATOR #1 | WIRELESS BASE STATION #1-3 | TIME PERIOD 1 (5:00-12:00) | 6:02 | I BAND | 20 [MHz] | 0 [MHz] (OFF-THE-AIR) |
| | OPERATOR #2 | WIRELESS BASE STATION #2-3 | TIME PERIOD 1 (5:00-12:00) | 6:02 | I BAND | 20 [MHz] | 20 [MHz] (2,100–2,120 [MHz]) |
| | ... | | | | | | |
| | OPERATOR #10 | WIRELESS BASE STATION #10-3 | TIME PERIOD 1 (5:00-12:00) | 6:02 | I BAND | 20 [MHz] | 0 [MHz] (OFF-THE-AIR) |

2900

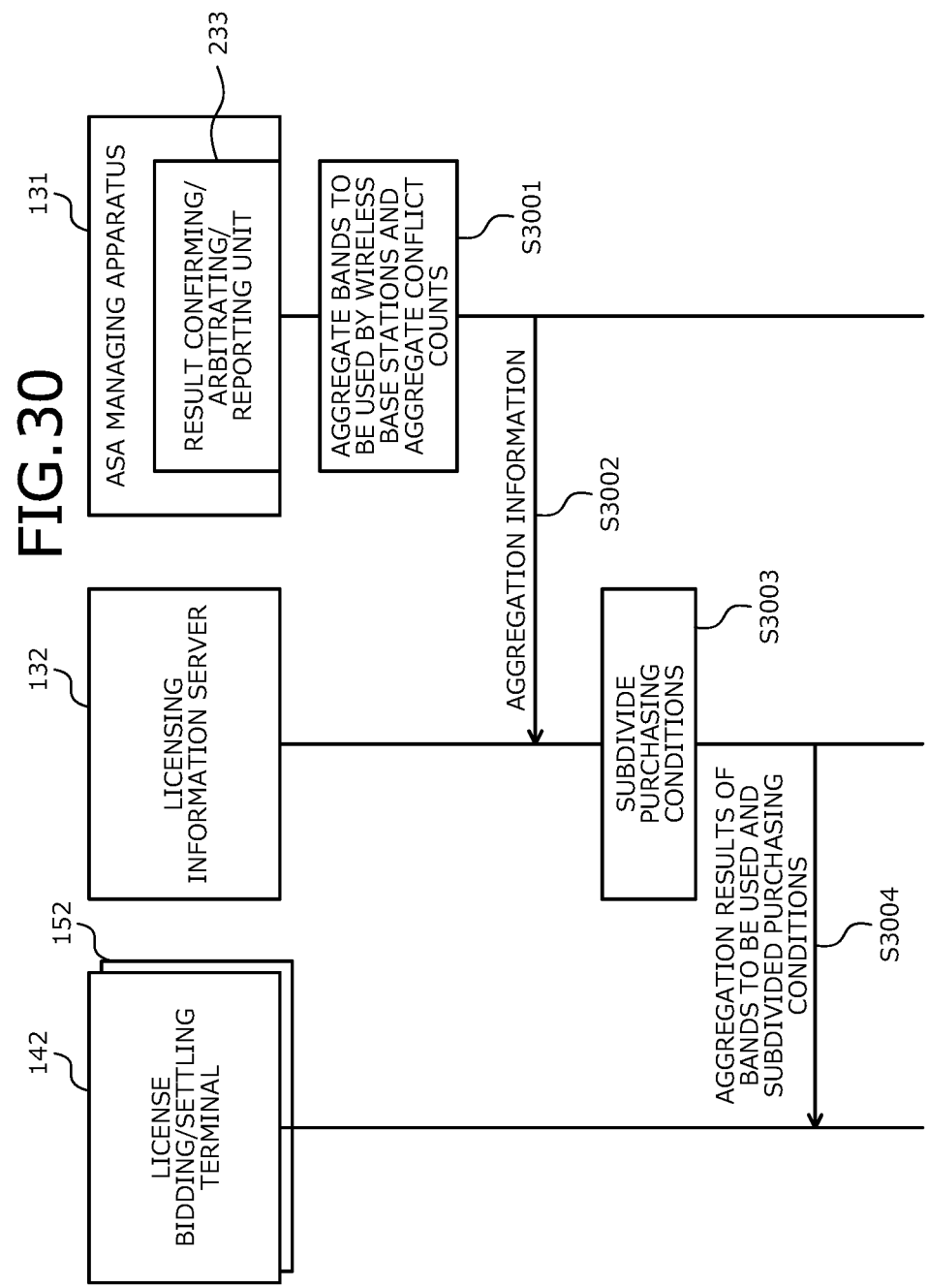

| TARGET AREA | TIME PERIOD | BANDWIDTH UTILIZATION RIGHT (FREQUENCY BAND IS I BAND (MAXIMUM 20[MHz])) | USED BAND HISTORY | SUBDIVISION TARGET | PURCHASING DETAILS (PURCHASE NECESSITY AND PRIORITY) |
|---|---|---|---|---|---|
| AREA A (LATITUDE A· LONGITUDE A) | TIME PERIOD 1 (5:00-12:00) | 10 [MHz] | 0 | | |
| | | 20 [MHz] | 0 | | |
| | TIME PERIOD 2 (12:00-18:00) | 10 [MHz] | 0 | | |
| | | 20 [MHz] | 0 | | |
| | TIME PERIOD 3 (18:00-5:00) | 10 [MHz] | 1 | | |
| | | 20 [MHz] | 0 | | |
| AREA B (LATITUDE B· LONGITUDE B) | TIME PERIOD 1 (5:00-9:00) | 10 [MHz] | 0 | TARGET | |
| | | 20 [MHz] | 0 | TARGET | |
| | TIME PERIOD 1.1 (9:00-12:00) | 10 [MHz] | 0 | TARGET | |
| | | 20 [MHz] | 0 | TARGET | |
| | TIME PERIOD 2 (12:00-18:00) | 10 [MHz] | 0 | | |
| | | 20 [MHz] | 1 | | |
| | TIME PERIOD 3 (18:00-5:00) | 10 [MHz] | 0 | | |
| | | 20 [MHz] | 1 | | |
| ⋮ | | | | | |
| AREA Z (LATITUDE Z· LONGITUDE Z) | TIME PERIOD 1 (5:00-12:00) | 10 [MHz] | 0 | | |
| | | 20 [MHz] | 0 | | |
| | TIME PERIOD 2 (12:00-18:00) | 10 [MHz] | 0 | | |
| | | 20 [MHz] | 0 | | |
| | TIME PERIOD 3 (18:00-5:00) | 10 [MHz] | 0 | | |
| | | 20 [MHz] | 0 | | |

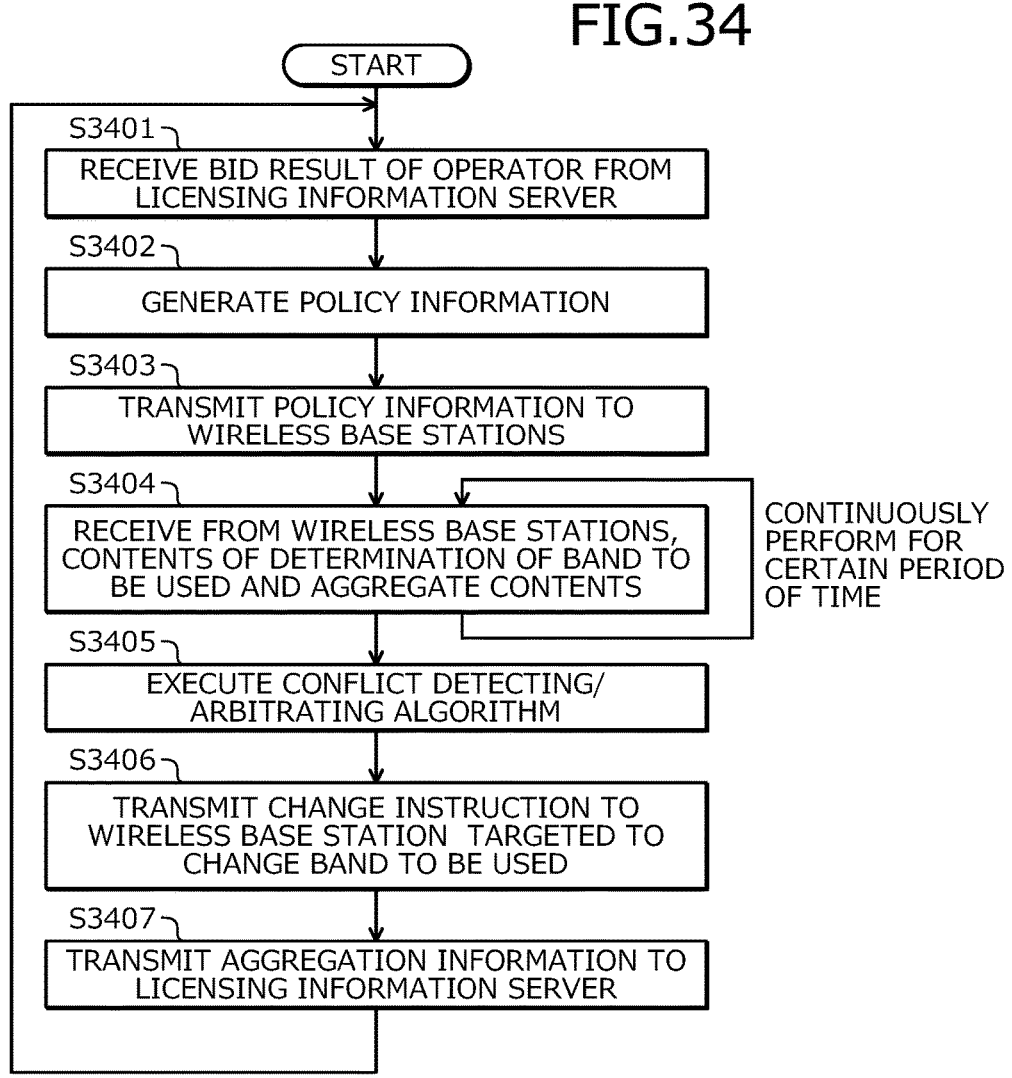

WIRELESS ACCESS SYSTEM

CROSS REFERENCE TO RELATED APPLICATIONS

This application is a continuation application of International Application PCT/JP2014/078362, filed on Oct. 24, 2014, and designating the U.S., the entire contents of which are incorporated herein by reference.

FIELD

The embodiments discussed herein relate to a wireless access system.

BACKGROUND

Authorized shared access (ASA) in which authorized operators share band is conventionally known. Further, a technique of providing an interface that performs communication between a server and base stations, and consolidating and managing information of the base stations at the server is known (for example, refer to Published Japanese-Translations of PCT Applications, Publication Nos. 2013-545364 and 2012-518927).

A scheme is further known in which a wireless communications apparatus transmits to a management station apparatus, information of primary and secondary use channels as channel request information, and the management station apparatus assigns a channel to the wireless communications apparatus, based on the channel request information and wireless environment (for example, refer to Japanese Laid-Open Patent Publication No. 2008-289056).

SUMMARY

According to an aspect of an embodiment, a wireless access system in which a first operator and a second operator share a predetermined band, includes a first base station belonging to the first operator, the first base station configured to transmit broadcast information indicating a priority of the first operator in the predetermined band; and a second base station belonging to the second operator, the second base station configured to perform wireless communication using a band configured based on a priority of the second operator in the predetermined band and the broadcast information transmitted by the first base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram depicting an example of license purchasing conditions;

FIG. 6 is a diagram depicting an example of license purchasing details;

FIG. 7 is a diagram depicting an example of policy information;

FIG. 8 is a diagram depicting an example of a wireless base station list;

FIG. 10 is a diagram depicting an example of positions and a time measured by a position/time measuring unit;

FIG. 11 is a diagram depicting an example of measurement results of band information measured by a band control unit;

FIG. 12 is a diagram depicting an example of measurement results of wireless information measured by a wireless measuring unit;

FIG. 14 is a diagram depicting an example of contents of a determination, by a band determining unit, of a band to be used;

FIG. 15 is a diagram depicting an example of a beacon transmitted in the second stage;

FIG. 16 is a diagram depicting an example of contents of the determination of the band to be used, in the second stage;

FIG. 17 is sequence diagram of one example of processes in a third stage of the use case;

FIG. 18 is a diagram depicting an example of aggregation results of beacons received from neighbor wireless base stations;

FIG. 20 is a diagram depicting an example of configuration of the band control unit;

FIG. 21 is a diagram depicting an example of a beacon transmitted in the third stage;

FIG. 22 is a diagram depicting an example of contents of the determination of the band to be used, in the third stage;

FIG. 24 is a diagram depicting an example of aggregation information;

FIG. 27 is a diagram depicting an example of conflict history;

FIG. 28 is a diagram depicting an example of aggregation information of bands to be used;

FIG. 29 is a diagram depicting an example of a change instruction for the band to be used;

FIG. 30 is sequence diagram of one example of processes in a fifth stage of the use case;

FIG. 31 is a diagram depicting an example of subdivided purchasing conditions;

FIG. 34 is a flowchart of an example of a process by an ASA managing apparatus according to the embodiment.

DESCRIPTION OF THE INVENTION

Embodiments of a wireless access system according to the present invention will be described in detail with reference the accompanying drawings.

Figure 1:
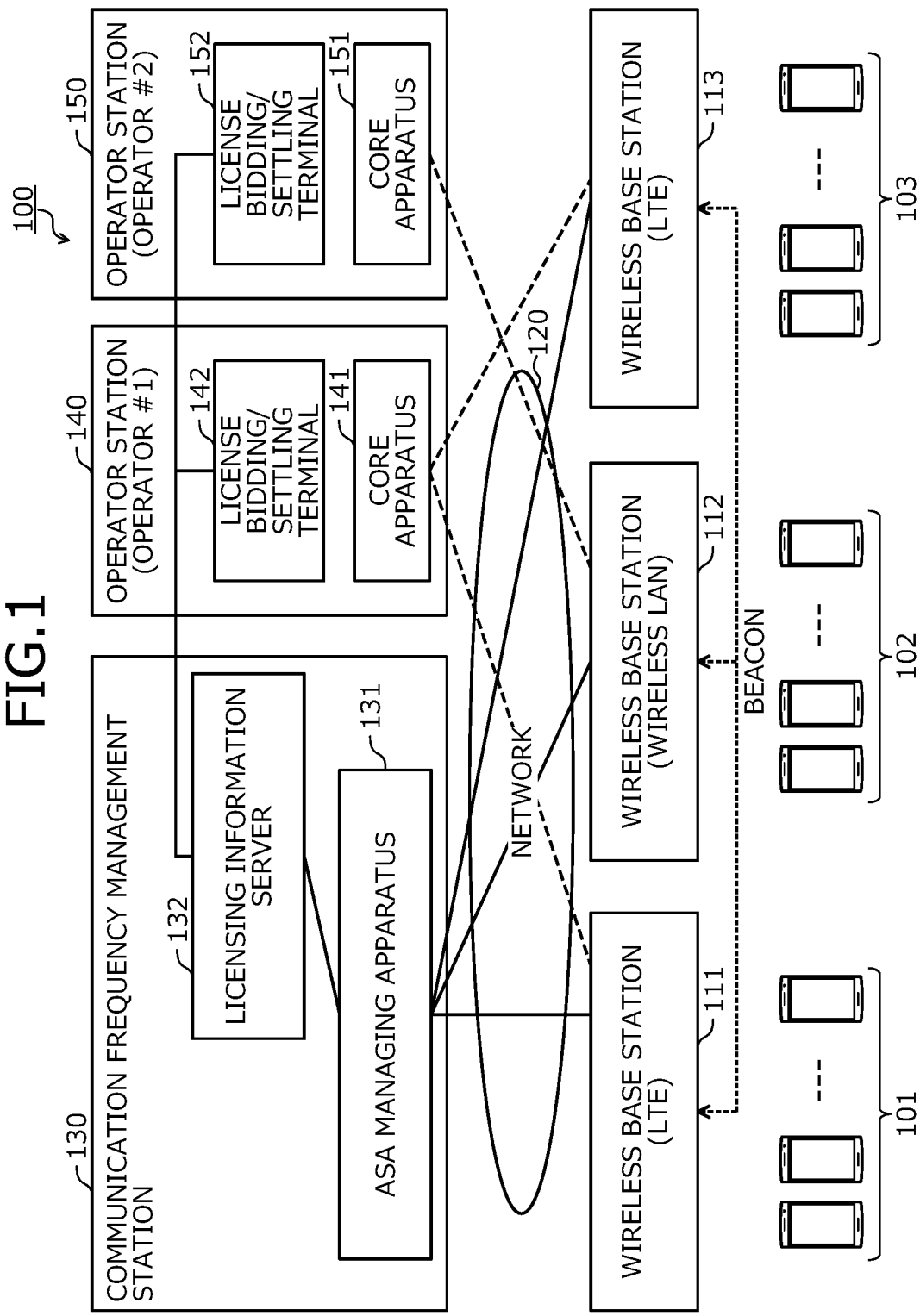
FIG. 1 is a diagram depicting an example of a wireless access system according to an embodiment.

FIG. 1 is a diagram depicting an example of a wireless access system according to an embodiment. As depicted in FIG. 1, a wireless access system 100 according to the embodiment includes user equipment (UE) groups 101 to 103 and wireless base stations 111 to 113. The wireless access system 100 further includes a network 120, a communication frequency management station 130, an operator station 140, and an operator station 150.

Each UE (user terminal) included in the UE group 101 is in a communication area of the wireless base station 111 and wirelessly communicates with the wireless base station 111. The UEs included the UE group 101 communicate data through relays by the wireless base station 111, via a core apparatus 141 of the operator station 140 and the network 120.

Each UE included in the UE group 102 is in a communication area of the wireless base station 112 and wirelessly communicates with the wireless base station 112. The UEs included in the UE group 102 communicate data through relays by the wireless base station 112, via a core apparatus 151 of the operator station 150 and the network 120.

Each UE included in the UE group 103 is in a communication area of the wireless base station 113 and wirelessly communicates with the wireless base station 113. The UEs included in the UE group 103 communicate data through relays by the wireless base station 113, via the core apparatus 141 of the operator station 140 and the network 120.

The wireless base station 111 performs Long Term Evolution (LTE) or LTE-A wireless communication with the UE group 101 located in the communication area of the wireless base station 111 and thereby, relays data communication of the UE group 101.

The wireless base station 112 wirelessly communicates with the UE group 102 located in the communication area of the wireless base station 112 by a wireless local area network (LAN) and thereby, relays data communication of the UE group 102. The wireless LAN used by the wireless base station 112 is, for example, a wireless LAN supporting Wi-Fi. Wi-Fi is a registered trademark.

The wireless base station 113 performs LTE or LTE-A wireless communication with the UE group 103 located in the communication area of the wireless base station 113 and thereby, relays data communication of the UE group 103.

Each of the wireless base stations 111 to 113, for example, supports the Wi-Fi Alliance Passpoint. Each of the wireless base stations 111 to 113 may have a measuring function such as a Global Positioning System (GPS) function for measuring position.

Each of the wireless base stations 111 to 113, for example, may have a function of concurrently using multiple frequency bands to perform wireless communication such as carrier aggregation (CA).

Each of the wireless base stations 111 to 113 mutually transmits and receives beacons (radio signal beacon). The beacon, for example, may be a Passpoint beacon. A Passpoint beacon is a signal compatible with Wi-Fi specifications of the Wi-Fi Alliance and is easily received by a communications apparatus supporting Wi-Fi. Therefore, use of the beacon enables a system to be built without use of special communications apparatuses. As the Passpoint beacon, for example, a beacon specified in the Wi-Fi Alliance Hotspot 2.0(Release 1) Technical Specification may be used. The beacon transmitted and received by the wireless base stations 111 to 113 will be described hereinafter.

The network 120 is a network that connects the wireless base stations 111, 113, the wireless base station 112, the communication frequency management station 130, and the operator stations 140, 150. For example, the network 120 is communications infrastructure such as the Internet including public and dedicated optical fiber networks.

The communication frequency management station 130 is a facility that manages ASA operations and, for example, delivers frequency license policies to the wireless base stations of the operators, aggregates the utilization state, discloses information to the operators, etc. The communication frequency management station 130, for example, is an Access Network Query Protocol (ANQP) server that issues Passpoint policies. The communication frequency management station 130 includes an ASA managing apparatus 131 and a licensing information server 132.

The ASA managing apparatus 131 executes processes such as creation of frequency license policies according to license purchasing information from operators, delivery to the wireless base stations, collection of frequency utilization states of the wireless base stations, arbitration when conflict occurs, and the like. The ASA managing apparatus 131 further transmits (deploys) the results of the processes to the licensing information server 132.

The licensing information server 132 is a system that sells to operators, licenses with respect to items such as License Level, License Time, MAX Bandwidth, Min Bandwidth, Location, and the like. The licensing information server 132, for example, transmits the purchasing status of operators to the ASA managing apparatus 131.

The licensing information server 132 further transmits to the operators, band utilization results transmitted from the ASA managing apparatus 131. The licensing information server 132 may subdivide license items based on the frequency of conflict arbitration.

The operator station 140 is a station of operator #1 (carrier) that provides LTE communication by the wireless base stations 111, 113. To secure more wireless band, operator #1 of the operator station 140 is a member of a system that purchases communication frequency licenses from the communication frequency management station 130. For example, the operator station 140 includes the core apparatus 141 and a license bidding/settling terminal 142.

The core apparatus 141 is a core network apparatus that is connected to the wireless base stations 111, 113 and performs data communication with the UE groups 101, 103. For example, data communication by the core apparatus 141 includes, for example, the transmission and reception of internet information, voice data such as telephone calls, and the like.

The license bidding/settling terminal 142 is a terminal that displays frequency band license products presented by the licensing information server 132, is operated by operator #1 to make purchases, and the like. Further, the license bidding/settling terminal 142 displays the current frequency utilization state at the wireless base stations 111, 113. As a result, operator #1 is able to confirm the state of use of a purchased license. Further, when there is subdivision of a license for a time period or a region having a high frequency of conflict, the license bidding/settling terminal 142 displays the subdivision and receives from operator #1, operation for the purchase of an additional license.

The operator station 150 is a station of operator #2 that provides wireless LAN communication by the wireless base station 112. To secure more wireless band, operator #2 of the operator station 150 is a member of a system that purchases communication frequency licenses from the communication frequency management station 130. For example, the operator of the operator station 150 includes the core apparatus 151 and a license bidding/settling terminal 152.

The core apparatus 151 is a core network apparatus that is connected to the wireless base station 112 and performs data communication with the UE group 102. For example, data communication by the core apparatus 151 includes, for example, the transmission and reception of internet information, voice data such as telephone calls, and the like.

The license bidding/settling terminal 152 is a terminal that displays frequency band license products presented by the licensing information server 132, is operated by operator #2 to make purchases, and the like. Further, the license bidding/settling terminal 152 displays the current frequency utilization state at the wireless base station 112. As a result, operator #2 is able to confirm the state of used of a purchased license. Further, when there is subdivision of a license in a time period or a region having a high frequency of conflict, the license bidding/settling terminal 152 displays the subdivision and receives from operator #2, operation for the purchase of an additional license.

In the example depicted in FIG. 1, the communication frequency management station 130 is connected to the operator stations 140, 150 of operators #1, #2, however, the communication frequency management station 130 may be further connected to operator stations of numerous operators (e.g., operators #1 to #10).

In the example depicted in FIG. 1, although a case has been described where the wireless access system 100 includes the LTE wireless base stations 111, 113 and the wireless base station 112 of a wireless LAN, configuration of the wireless base stations is not limited hereto. For example, the wireless access system 100 may include only LTE wireless base stations of differing operators. Further, the wireless access system 100 may include only wireless base stations of wireless LANs of differing operators. The mobile communications network standard is not limited to LTE and various standards such as 3G or the like are applicable.

Figure 2:
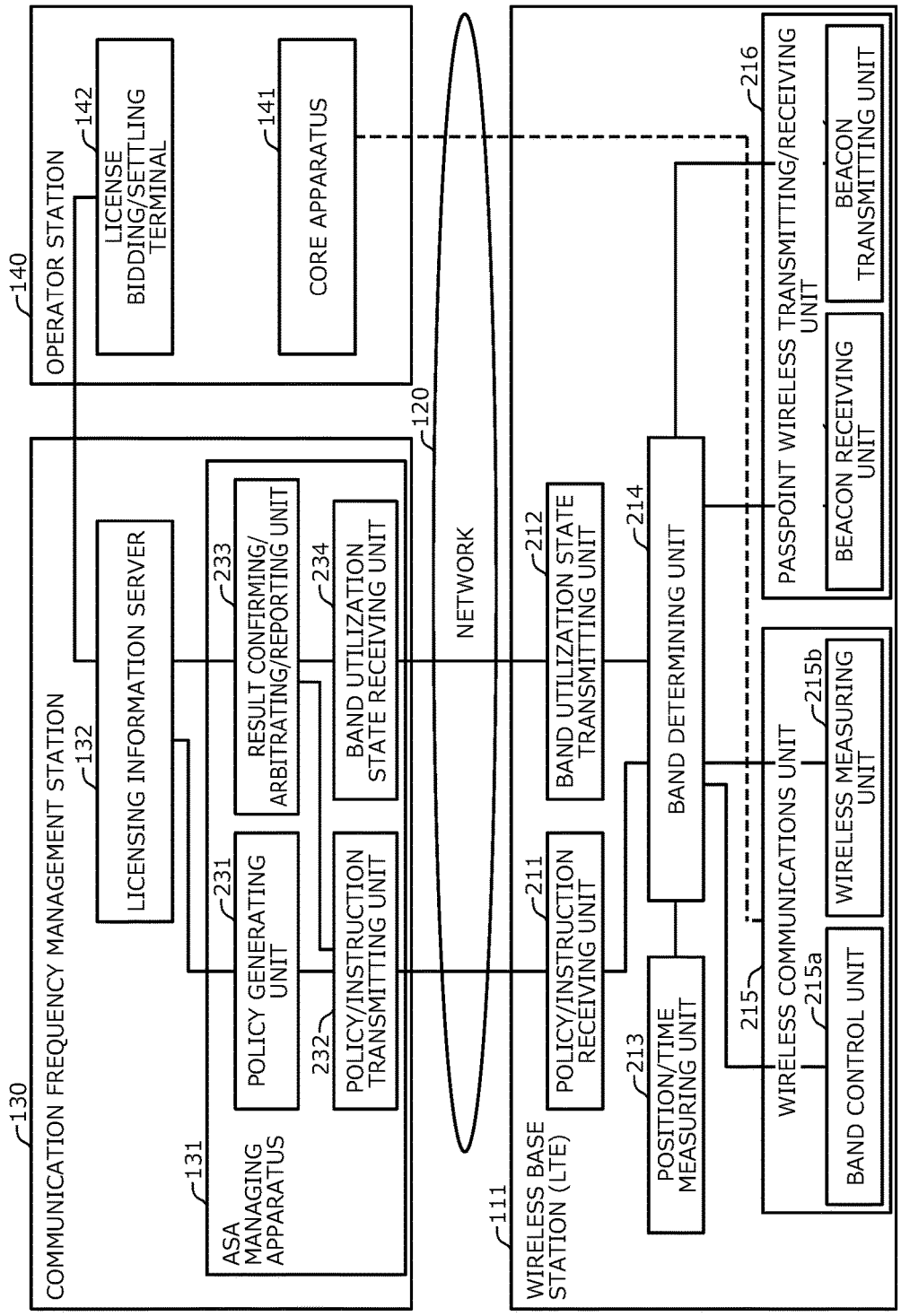
FIG. 2 is a diagram depicting an example of configuration of apparatuses of the wireless access system.

FIG. 2 is a diagram depicting an example of configuration of apparatuses of the wireless access system. In FIG. 2, portions identical to those depicted in FIG. 1 are given the same reference numerals used in FIG. 1 and description is omitted hereinafter. In FIG. 2, of the wireless base stations 111 to 113, the wireless base station 111 will be described as a first base station belonging to operator #1 as a first operator, however, description of the wireless base stations 112, 113 is the same as the wireless base station 111. In this case, other operators such as operator #2, are second operators different from the first operator. Further, wireless base stations such as the wireless base station 112 belonging to the other operators such as operator #2 are second base stations different from the first base station. Further, in FIG. 2, although the operator station 140 accommodating the wireless base station 111 will be described, description of the operator station 150 accommodating the wireless base station 112 is the same as the operator station 140.

As depicted in FIG. 2, the wireless base station 111 has a policy/instruction receiving unit 211, a band utilization state transmitting unit 212, a position/time measuring unit 213, a band determining unit 214, a wireless communications unit 215, and a Passpoint wireless transmitting/receiving unit 216.

The policy/instruction receiving unit 211 receives a change instruction or policy information transmitted from a policy/instruction transmitting unit 232 of the communication frequency management station 130 and outputs the received change instruction or policy information to the band determining unit 214.

The band utilization state transmitting unit 212 transmits to a band utilization state receiving unit 234 of the ASA managing apparatus 131, a band determined for use by the band determining unit 214. The band utilization state transmitting unit 212 may further transmit to the band utilization state receiving unit 234 of the ASA managing apparatus 131, information indicating position, traffic volume, the degree of interference of the band determined for use by the band determining unit 214, and the like.

The position/time measuring unit 213 is a measuring unit that obtains time information that indicates the current time and information that indicates the position at which the wireless base station 111 is installed. The information indicating the position at which the wireless base station 111 is installed, for example, is information indicating latitude, longitude, altitude, etc. The position/time measuring unit 213 outputs to the band determining unit 214, measurement results of current information and/or the position of the wireless base station 111.

The band determining unit 214 determines a band to be used by the wireless base station 111. For example, the band determining unit 214 determines a band to be used based on policy information from the policy/instruction receiving unit 211, respective measurement results of the position/time measuring unit 213 and the wireless measuring unit 215b, beacon information from a beacon receiving unit 216a, etc. Determination, by the band determining unit 214, of the band to be used will be described hereinafter.

The band determining unit 214, after determining the band to be used, performs control related to band changes by a band control unit 215a. Further, the band determining unit 214, at this time, generates and outputs to a beacon transmitting unit 216b, beacon information for transmitting a beacon from the wireless base station 111. Further, the band determining unit 214 transmits to the ASA managing apparatus 131, via the band utilization state transmitting unit 212, contents of the determination of the band to be used.

The band determining unit 214, when a change instruction for the band to be used has been output from the policy/instruction receiving unit 211, performs control related to the band change by the band control unit 215a according to the change instruction. The band determining unit 214, at this time, generates and outputs to the beacon transmitting unit 216b, beacon information for transmitting a beacon from the wireless base station 111. The band determining unit 214 transmits to the ASA managing apparatus 131, via the band utilization state transmitting unit 212, contents of the determination of the band to be used based on the change instruction.

The wireless communications unit 215 wirelessly communicates with UEs (e.g., the UE group 101). The band to be used at the wireless communications unit 215 for wireless communication is changeable and the band determined by the band determining unit 214 is used. The wireless communications unit 215 of the wireless base station 111 supports LTE wireless communication. The wireless communications unit 215 of the wireless base station 113 also supports LTE wireless communication. The wireless communications unit 215 of the wireless base station 112 supports wireless communication by a wireless LAN.

For example, the wireless communications unit 215 has the band control unit 215a and the wireless measuring unit 215b. The band control unit 215a changes the band of wireless communication under the control from the band determining unit 214. Further, the band control unit 215a notifies the band determining unit 214 of the current status of the band to be used (bandwidth and band frequency value).

The wireless measuring unit 215b measures information related to quality such as the overall amount of transmitted and received communication traffic of the wireless communications unit 215, the total number of users of communicating UEs. The wireless measuring unit 215b notifies the band determining unit 214 of the measurement results.

The Passpoint wireless transmitting/receiving unit 216 transmits and receives beacons in a Passpoint system. For example, the Passpoint wireless transmitting/receiving unit 216 has the beacon receiving unit 216a and the beacon transmitting unit 216b.

The beacon receiving unit 216a has a function of receiving a beacon in a Passpoint system, transmitted from a neighbor wireless base station. A function of receiving a beacon in a Passpoint system, for example, is a function of operating as a wireless LAN terminal corresponding to Passpoint. The beacon receiving unit 216a outputs the band determining unit 214, beacon information indicating contents of the received beacon.

The beacon transmitting unit 216b has a function of transmitting, under the control from the band determining unit 214, a beacon in a Passpoint system to a neighbor wireless base station. A function of transmitting a beacon in a Passpoint system, for example, is a function of operating as a wireless LAN access point supporting Passpoint.

The transmission power of a beacon from the beacon transmitting unit 216b, for example, is controlled by the band determining unit 214. For example, the transmission power of a beacon by the beacon transmitting unit 216b is controlled to a same extent as the transmission power of a data signal from the wireless communications unit 215. As a result, the data communication range of the wireless base station 111 and the range reached by a beacon from the wireless base station 111 may be made to be substantially the same range.

In this manner, although the wireless base station 111 is a wireless base station that supports LTE, the wireless base station 111 further has a function of transmitting and receiving beacons corresponding to a Passpoint of a wireless LAN. Similarly, although the wireless base station 113 is a wireless base station that supports LTE, the wireless base station 113 further has a function of transmitting and receiving beacons corresponding to a Passpoint of a wireless LAN. The wireless base station 112 supports a wireless LAN and therefore, a function of transmitting and receiving beacons corresponding to a Passpoint may double as a function supporting a wireless LAN.

The ASA managing apparatus 131 performs ASA in the wireless access system 100. For example, the ASA managing apparatus 131 has a policy generating unit 231, the policy/instruction transmitting unit 232, a result confirming/arbitrating/reporting unit 233, and the band utilization state receiving unit 234.

The policy generating unit 231 generates frequency license policy information for each operator according to the license purchasing status transmitted from the licensing information server 132. Policy information is, for example, information indicating a policy according to items such as License Level, License Time, MAX Bandwidth, Min Bandwidth, Location, and the like. The policy generating unit 231 outputs generated policy information to the policy/instruction transmitting unit 232.

The policy/instruction transmitting unit 232 transmits to the wireless base stations (the wireless base stations 111 to 113) of the operators, the policy information output from the policy generating unit 231. Further, the policy/instruction transmitting unit 232 transmits to a wireless base station specified among the wireless base stations 111 to 113, a change instruction for the band to be used, the change instruction being output from the result confirming/arbitrating/reporting unit 233. The policy/instruction transmitting unit 232 stores destination information (e.g., IP address) of the wireless base stations 111 to 113 to perform transmission of policy information and change instructions to the wireless base stations 111 to 113.

The result confirming/arbitrating/reporting unit 233 makes an inquiry of the band utilization states of the wireless base stations of the operators output from the band utilization state receiving unit 234 and performs arbitration when conflict occurs such as when the same band is used between neighboring wireless base stations. The result confirming/arbitrating/reporting unit 233 outputs to the policy/instruction transmitting unit 232, a change instruction for the band to be used based on arbitration results. Further, the result confirming/arbitrating/reporting unit 233 transmits results of arbitration and inquiries to the licensing information server 132.

The band utilization state receiving unit 234 receives band utilization states (bandwidths and band frequency values) transmitted from the wireless base stations 111 to 113 and outputs the received band utilization states to the result confirming/arbitrating/reporting unit 233. The band utilization states transmitted from the wireless base stations 111 to 113 include contents of the determination of the band to be used based on a change instruction from the ASA managing apparatus 131, contents of the determination of the band to be used by a band-to-be-used determining algorithm described hereinafter.

Figure 3:
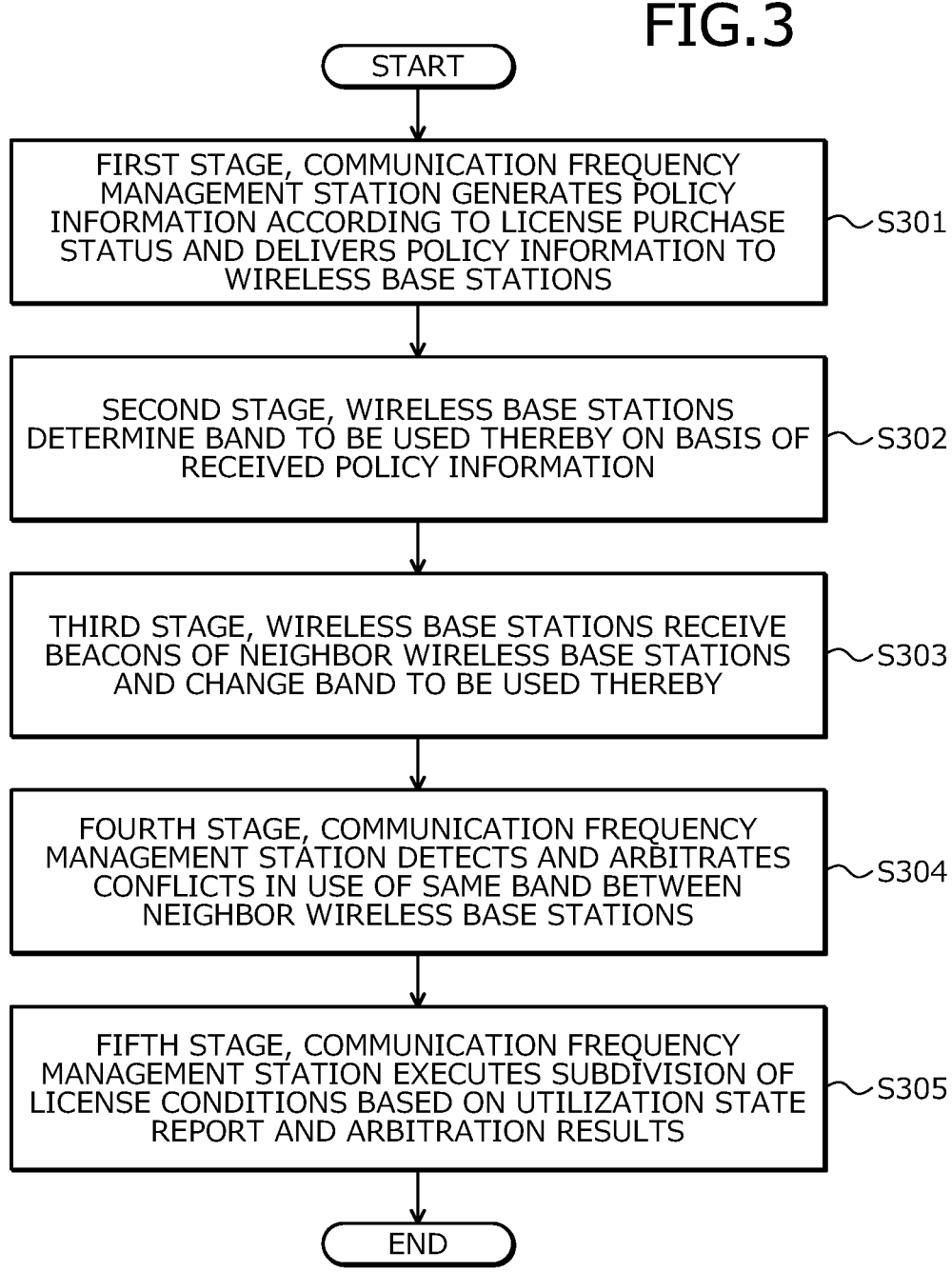
FIG. 3 is a flowchart of one example of a use case according to the embodiment.

FIG. 3 is a flowchart of one example of a use case according to the embodiment. In the wireless access system 100 according to the embodiment, as an example of a use case, for example, the steps depicted in FIG. 3 are executed.

As a first stage, the communication frequency management station 130 generates policy information according to a license purchase status and delivers the generated policy information to the wireless base stations 111 to 113 (wireless base stations) (step S301). At step S301, first, the licensing information server 132 defines a license purchasing condition and the defined license purchasing condition is displayed to the operators, via the license bidding/settling terminal 142.

The operators perform licensing purchase operations on the license bidding/settling terminal 142. Next, the licensing information server 132 aggregates purchase results of the operators and results of the aggregation are transmitted to the policy generating unit 231. The policy generating unit 231 generates policy information based on the aggregation results and the generated policy information is delivered to the wireless base stations 111 to 113 (wireless base stations).

As a second stage, the wireless base stations 111 to 113 each determines the band to be used thereby on the basis of the policy information received at step S301 (step S302). At step S302, first, the band determining unit 214 of each of the wireless base stations 111 to 113 receives the policy information via the policy/instruction receiving unit 211 and determines the band to be used on the basis of information from the position/time measuring unit 213, the band control unit 215a, and the wireless measuring unit 215b.

A beacon indicating contents of the determination of the band to be used as determined by the band determining unit 214 is transmitted from the beacon transmitting unit 216b to neighbor wireless base stations. As a result, the wireless base stations 111 to 113 transmit beacons indicating mutual contents of the determination of the band to be used. Further, the band determining unit 214 of each of the wireless base stations 111 to 113 transmits to the band utilization state receiving unit 234, contents of the determination of the band to be used, via the band utilization state transmitting unit 212.

As a third stage, the wireless base stations 111 to 113 each receives beacons of neighbor wireless base stations and based on the received beacons, changes the band to be used thereby (step S303). As step S303, first, the beacon receiving unit 216a of each of the wireless base stations 111 to 113 receives beacons from neighbor wireless base stations and outputs beacon information indicating contents of the received beacons to the band determining unit 214. The band determining unit 214 on the basis of the beacon information output from the beacon receiving unit 216a, the policy information received via the policy/instruction receiving unit 211, and information from the position/time measuring unit 213, the band control unit 215a, and the wireless measuring unit 215b, determines the band to be used.

A beacon indicating contents of the determination of the band to be used as determined by the band determining unit 214 is transmitted from the beacon transmitting unit 216b to neighbor wireless base stations. As a result, the wireless base stations 111 to 113 transmit beacons indicating mutual contents of the determination of the band to be used. Further, the band determining unit 214 of each of the wireless base stations 111 to 113 transmits to the band utilization state receiving unit 234, contents of the determination of the band to be used, via the band utilization state transmitting unit 212.

As a fourth stage, the communication frequency management station 130 detects and arbitrates conflicts in the use of the same band between neighbor wireless base stations (step S304). At step S304, the result confirming/arbitrating/reporting unit 233 of the ASA managing apparatus 131 aggregates contents of the determination of the band to be used from the wireless base stations 111 to 113 received via the band utilization state receiving unit 234.

The result confirming/arbitrating/reporting unit 233 detects and arbitrates cases (conflicts) in the use of the same band between neighbor wireless base stations. Further, the result confirming/arbitrating/reporting unit 233, based on arbitration results, transmits via the policy/instruction transmitting unit 232, a change instruction for the band to be used, the change instruction being transmitted to a wireless base station requiring a changing of the band to be used.

As a fifth stage, the communication frequency management station 130 executes subdivision of license conditions based on a utilization state report and arbitration results (step S305). At step S305, the result confirming/arbitrating/reporting unit 233 of the communication frequency management station 130 periodically aggregates of bands to be used by the wireless base stations 111 to 113 and aggregates arbitration counts, and transmits aggregation results to the licensing information server 132.

The licensing information server 132 displays to the operators, via the license bidding/settling terminals 142, 152, the aggregation results received from the communication frequency management station 130. Further, the licensing information server 132 performs subdivision of the license conditions for the condition of the highest arbitration count and displays the subdivision results to the operators, via the license bidding/settling terminals 142, 152.

Figure 4:
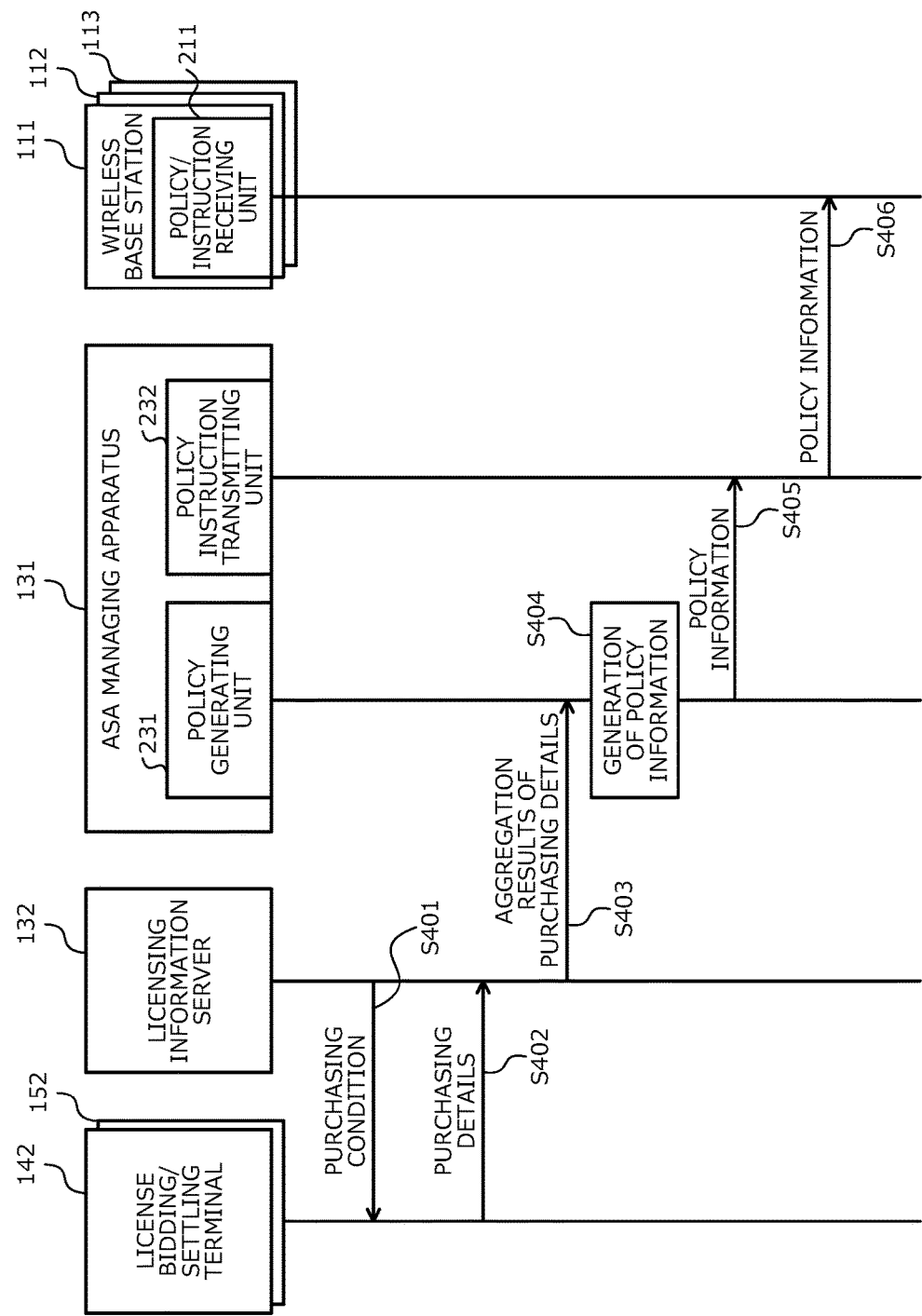
FIG. 4 is sequence diagram of one example of processes in a first stage of the use case.

FIG. 4 is sequence diagram of one example of processes in the first stage of the use case. In the first stage depicted at step S301 in FIG. 3, apparatuses of the wireless access system 100, for example, execute the steps depicted in FIG. 4.

First, the licensing information server 132 transmits license purchasing conditions to the license bidding/settling terminals 142, 152 (step S401). Each of the license bidding/settling terminals 142, 152 displays to respective operators #1, #2, the purchasing conditions transmitted at step S401 and receives purchasing operations. Next, the license bidding/settling terminals 142, 152 transmit to the licensing information server 132, purchasing details based on the received purchasing operations (step S402).

Next, the licensing information server 132 transmits to the ASA managing apparatus 131, aggregation results of the purchasing details transmitted at step S402 (step S403). The policy generating unit 231 of the ASA managing apparatus 131 generates policy information based on the aggregation results transmitted at step S403 (step S404). The policy generating unit 231 of the ASA managing apparatus 131 outputs to the policy/instruction transmitting unit 232, the policy information generated at step S404 (step S405).

Next, the policy/instruction transmitting unit 232 transmits to the wireless base stations 111 to 113 based on a wireless base station list indicating IP addresses of the wireless base stations 111 to 113, the policy information output at step S405 (step S406), ending the series of processes in the first stage. The policy information transmitted at step S406 is received by the policy/instruction receiving units 211 of the wireless base stations 111 to 113.

FIG. 5 is a diagram depicting an example of license purchasing conditions. At step S401 depicted in FIG. 4, the licensing information server 132, for example, defines license purchasing conditions 500 depicted in FIG. 5 and transmits the defined purchasing conditions 500 to each of the license bidding/settling terminals 142, 152.

Hereinafter, although the license bidding/settling terminal 142 of operator #1 will be mainly described, description of the license bidding/settling terminal 152 of operator #2 is the same. The license bidding/settling terminal 142 displays the purchasing conditions 500 to operator #1. In the example depicted in FIG. 5, the purchasing conditions 500 are for the purchase of frequency bandwidth (bandwidth utilization right) according to time periods and target areas of a service.

The purchasing details includes purchase necessity and the priority of application of the license. As purchasing details, bulk purchases or time-limited purchasing details effective for only a certain period of time (e.g., monthly or yearly) may be included. Further, a method of determining the value of licenses may be, for example, determining the value at the communication frequency management station 130 in advance and making a public offering, a method using auctions by bidding, and the like.

FIG. 6 is a diagram depicting an example of license purchasing details. Operator #1, based on the purchasing conditions 500 depicted in FIG. 5, for example, purchases a license by inputting purchasing details 600 depicted in FIG. 6 into the license bidding/settling terminal 142. At step S402 depicted in FIG. 4, the license bidding/settling terminal 142 transmits the input purchasing details 600 to the communication frequency management station 130. The purchasing details 600 are information indicating the purchasing status of ASA bands (predetermined bands) by operators.

In the example depicted in FIG. 6, operator #1, for example, with respect to area A, purchases a 20 [MHz] portion of time period 1 with intermediate priority, purchases a 10 [MHz] portion of time period 2 with low priority, and purchases a 10 [MHz] portion of time period 3 with high priority.

FIG. 7 is a diagram depicting an example of policy information. At step S404 depicted in FIG. 4, the policy generating unit 231 of the ASA managing apparatus 131, for example, generates policy information 700 depicted in FIG. 7. The policy information 700 is priority information indicating the priority of operators in ASA bands, based on information (e.g., the purchasing details 600) indicating the purchasing status of ASA bands (predetermined bands) by operators.

In the example depicted in FIG. 7, the policy information 700 is a matrix aggregating purchasing details of operators #2 to #10 in addition to the purchasing details 600 of operator. The policy/instruction transmitting unit 232 of the ASA managing apparatus 131, at step S406 depicted in FIG. 4, delivers the generated policy information 700 to the wireless base stations 111 to 113.

FIG. 8 is a diagram depicting an example of the wireless base station list. At step S406 depicted in FIG. 4, the policy/instruction transmitting unit 232 of the ASA managing apparatus 131, for example, based on a wireless base station list 800 depicted in FIG. 8, delivers policy information to the wireless base stations. In the wireless base station list 800, for example, wireless base stations #1-1, #1-2 indicate wireless base stations (e.g., the wireless base stations 111, 113) of operator #1. Further, for example, wireless base stations #2-1, #2-2 indicate wireless base stations (e.g., wireless base stations including the wireless base station 112) of operator #2.

For example, the policy/instruction transmitting unit 232 converts the policy information 700 depicted in FIG. 7 into a file and transmits the file of the policy information 700 to the policy/instruction receiving units 211 of the wireless base stations 111 to 113, based on the wireless base station list 800.

Figure 9:
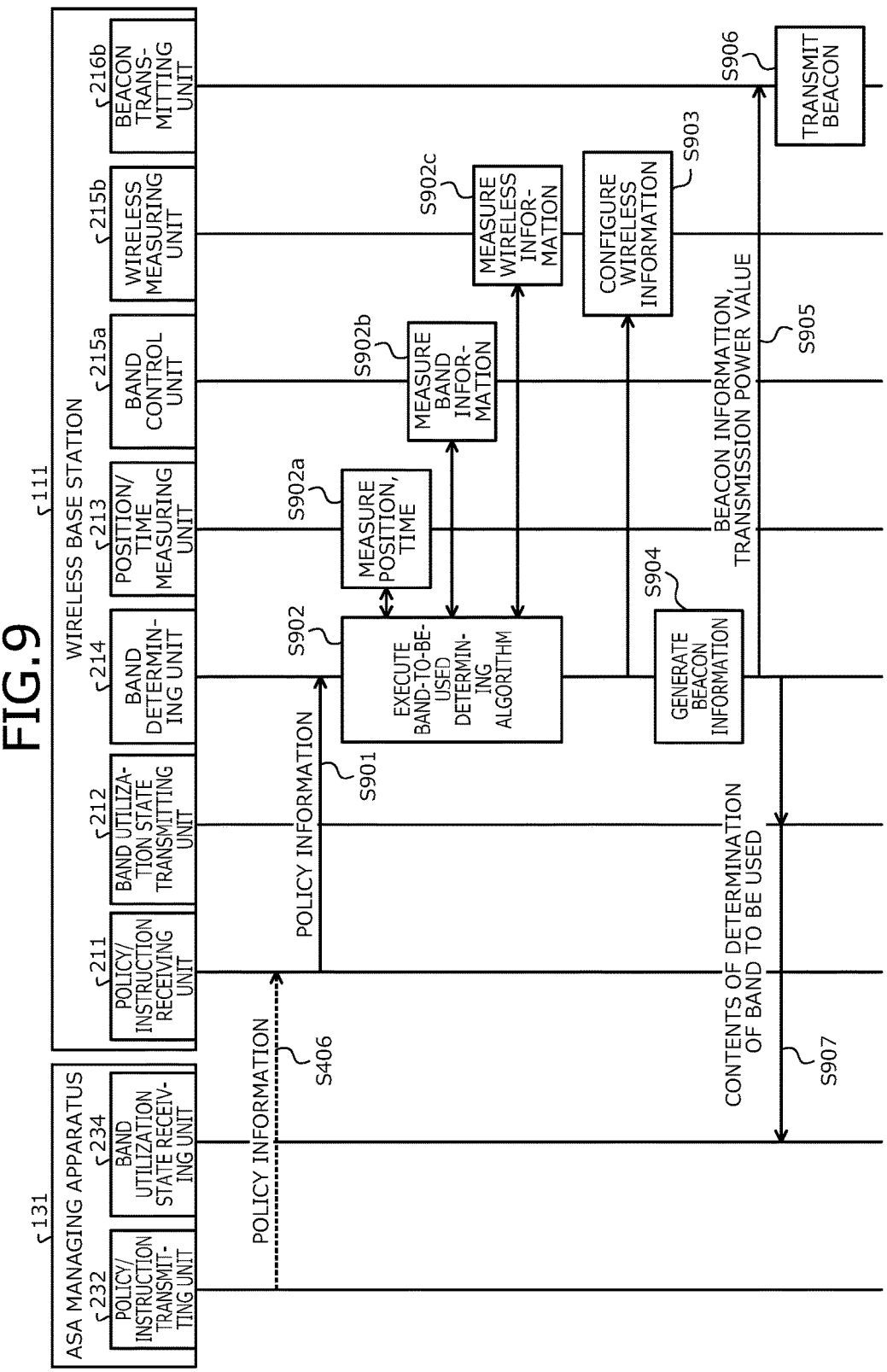
FIG. 9 is sequence diagram of one example of processes in a second stage of the use case.

FIG. 9 is sequence diagram of one example of processes in the second stage of the use case. In the second stage depicted at step S302 in FIG. 3, the apparatuses of the wireless access system 100, for example, execute the steps depicted in FIG. 9. First, the policy/instruction receiving unit 211 of the wireless base station 111 outputs to the band determining unit 214, the policy information transmitted at step S406 (first stage) depicted in FIG. 4 (step S901).

Next, the band determining unit 214 executes the band-to-be-used determining algorithm (step S902). At step S902, for example, the band determining unit 214 causes the position/time measuring unit 213 to execute position and time measurements and obtains the measurement results from the position/time measuring unit 213 (step S902a). The band determining unit 214 further causes the band control unit 215a to execute measurement of band information and obtains the measurement results from the band control unit 215a (step S902b). The band determining unit 214 causes the wireless measuring unit 215b to perform measurement of wireless information and obtains the measurement results from the wireless measuring unit 215b (step S902c).

The band determining unit 214 executes the band-to-be-used determining algorithm based on the policy information output at step S901 and the measurement results obtained at steps S902a to S902c and thereby, determines the band to be used. Next, the band determining unit 214 configures wireless information for the wireless measuring unit 215b, based on the band to be used determined at step S902 (step S903).

Next, the band determining unit 214 generates beacon information indicating the band to be used determined at step S902 (step S904). The band determining unit 214 outputs the beacon information generated at step S904 and a transmission power of the beacon to the beacon transmitting unit 216b (step S905). The beacon transmitting unit 216b wirelessly transmits using the transmission power value output at step S905, a beacon that is based on the beacon information output at step S905 (step S906).

The band determining unit 214 transmits to the ASA managing apparatus 131, via the band utilization state transmitting unit 212, the contents of the determination of the band to be used obtained at step S902 (step S907), ending the series of processes in the second stage. The determination contents transmitted at step S907 are received by the band utilization state receiving unit 234 of the ASA managing apparatus 131.

FIG. 10 is a diagram depicting an example of positions and a time measured by the position/time measuring unit. At step S902a depicted in FIG. 9, the position/time measuring unit 213, for example, outputs measurement results 1000 of positions and the time depicted in FIG. 10 to the band determining unit 214. The measurement results 1000 include as information elements, position information and time information.

The position information, for example, is information indicating the position of the wireless base station 111 measured by GPS or the like, and in the example depicted in FIG. 10, is information represented by latitude, longitude, altitude. The time information is information indicating the current time, and in the example depicted in FIG. 10, is information represented by the 24-hour time notation.

FIG. 11 is a diagram depicting an example of measurement results of band information measured by the band control unit. At step S902b depicted in FIG. 9, the band control unit 215a outputs to the band determining unit 214, for example, measurement results 1100 of band information depicted in FIG. 11. The measurement results 1100 include, as information elements, an operating operator name, a frequency band, a bandwidth to be used, and a wireless transmission power value.

The operating operator name is information indicating the operator accommodating the wireless base station and in the example depicted in FIG. 11 is information indicating operator #1. The frequency band is information indicating the frequency band used by the wireless communications unit 215 of the wireless base station 111 for ASA and in the example depicted in FIG. 11, indicates I band (width of 20 [MHz]).

The bandwidth to be used is the bandwidth used by the wireless communications unit 215 of the wireless base station 111 for ASA and in the example depicted in FIG. 11, indicates a width of 10 [MHz]. As indicated in the example depicted in FIG. 11, the bandwidth to be used may be indicated to be a band (2,100 to 2,110 [MHz]) of a width of 10 [MHz] in the I band and used by the wireless communications unit 215 of the wireless base station 111 for ASA. The wireless transmission power value is the transmission power value of a radio signal used by the wireless communications unit 215 of the wireless base station 111 for ASA and in the example depicted in FIG. 11, indicates 10 [dBm].

FIG. 12 is a diagram depicting an example of measurement results of wireless information measured by the wireless measuring unit. At step S902c depicted in FIG. 9, the wireless measuring unit 215b, for example, outputs measurement results 1200 of wireless information depicted in FIG. 12 to the band determining unit 214. The measurement results 1200 includes, as information elements, a communication traffic amount and a total user count of communicating UEs (mobile terminals).

The communication traffic amount is information indicating the current amount of wireless communication per unit time at the wireless communications unit 215 of the wireless base station 111 and in the example depicted in FIG. 12, is indicated to be 40 [Mbps]. The wireless communication at the wireless communications unit 215 of the wireless base station 111 may include wireless communication not using ASA. Further, in the example depicted in FIG. 12, the communication traffic amount indicates a band utilization rate (60%) that is the percentage of the current communication traffic amount with respect to the maximum communication traffic amount (band) of wireless communication at the wireless communications unit 215.

The total user count of communicating UEs is information indicating a count of UEs performing wireless communication with the wireless communications unit 215 of the wireless base station 111 and in the example depicted in FIG. 12 is indicates 100 users. Further, in the example depicted in FIG. 12, the total user count of communicating UEs indicates a system utilization rate (70%) that is the percentage of the number of UEs wirelessly communicating with the wireless communications unit 215 of the wireless base station 111 with respect to the maximum number of UEs that can concurrently communicate with the wireless communications unit 215 of the wireless base station 111.

Figure 13:
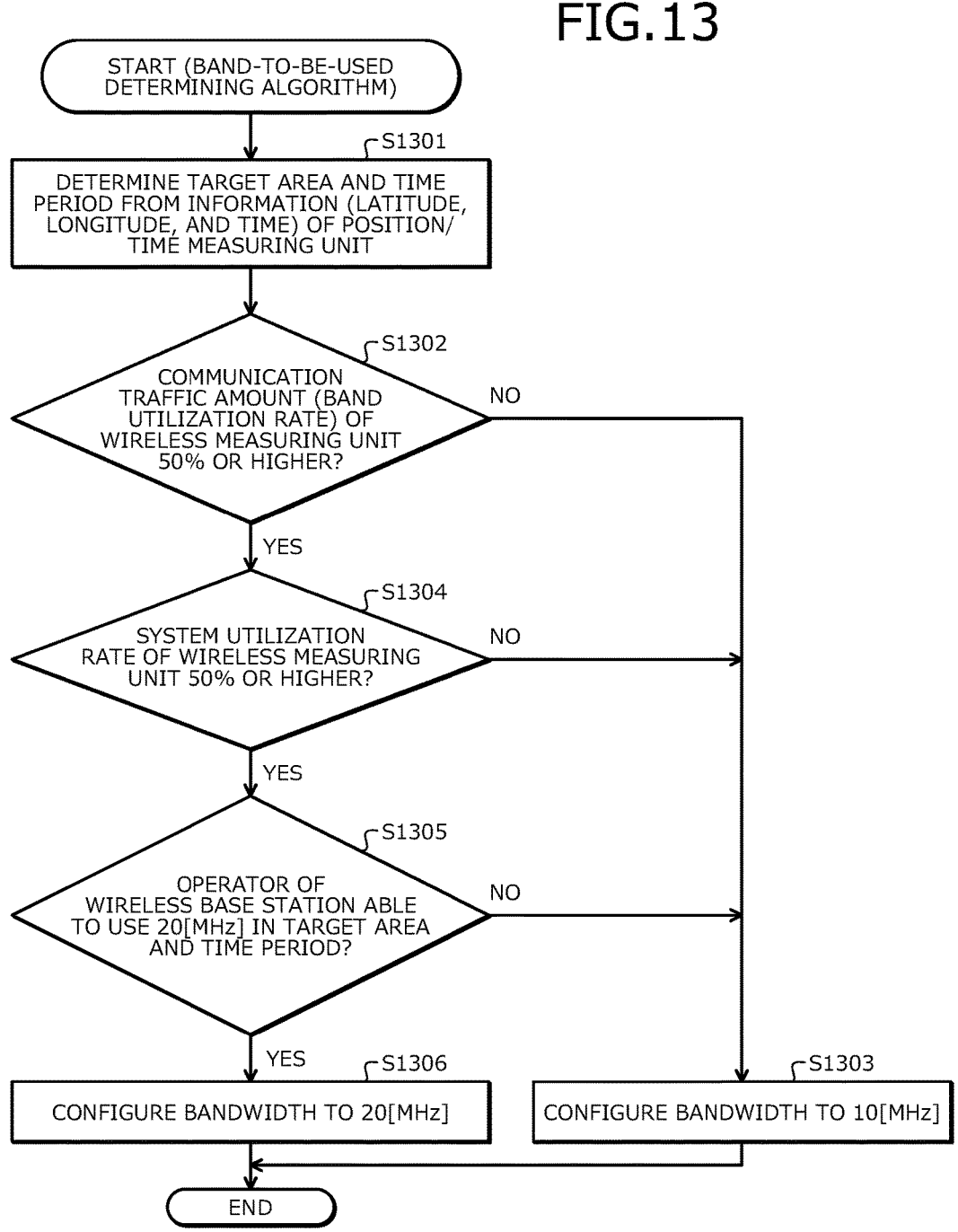
FIG. 13 is a flowchart of an example of a band-to-be-used determining algorithm in the second stage.

FIG. 13 is a flowchart of an example of the band-to-be-used determining algorithm in the second stage. The band determining unit 214, at step S902 depicted in FIG. 9, for example, executes the steps depicted in FIG. 13, as the band-to-be-used determining algorithm.

First, the band determining unit 214 determines the target area and time period from information (latitude, longitude, and time) from the position/time measuring unit 213 (step S1301). Next, the band determining unit 214 determines if the communication traffic amount (band utilization rate) of the wireless measuring unit 215b is 50% or higher (step S1302). The communication traffic amount, for example, may be obtained from the measurement results 1200 of the wireless information depicted in FIG. 12.

At step S1302, when the communication traffic amount is less than 50% (step S1302: NO), it may be determined that even without using a large bandwidth by ASA, communication service of a sufficient quality may be provided. In this case, the band determining unit 214 configures the bandwidth to be used to 10 [MHz] (step S1303), and ends the series of processes.

At step S1302, when the communication traffic amount is 50% or higher (step S1302: YES), the band determining unit 214 determines if the system utilization rate of the wireless measuring unit 215b is 50% or higher (step S1304). The system utilization rate, for example, is a percentage of the count (system utilization count) of UEs communicating with the wireless measuring unit 215b of the number of UEs that the wireless measuring unit 215b can accommodate. The system utilization rate, for example, may be obtained from the measurement results 1200 of the wireless information depicted in FIG. 12.

At step S1304, when the system utilization rate is less than 50% (step S1304: NO), it may be determined that even without using a large bandwidth by ASA, communication service of a sufficient quality may be provided. In this case, the band determining unit 214 transitions to step S1303. When the system utilization rate is 50% or higher (step S1304: YES), the band determining unit 214 transitions to step S1305.

In other words, the band determining unit 214 judges based on the policy information received from the ASA managing apparatus 131, whether the operator of the wireless base station 111 is able to use 20 [MHz] in the target area and time period determined at step S1301 (step S1305). For example, based on the policy information 700 depicted in FIG. 7, when the operator of the wireless base station 111 has purchased 20 [MHz] with respect to the target area and time period, the band determining unit 214 judges that use of 20 [MHz] with respect to the target area and time period is possible. Here, the priority of the purchase is irrelevant.

At step S1305, when the operator of the wireless base station 111 is not able to use 20 [MHz] (step S1305: NO), the band determining unit 214 transitions to step S1303. When the operator of the wireless base station 111 is able to use 20 [MHz] (step S1305: YES), the band determining unit 214 configures the bandwidth to be used to 20 [MHz] (step S1306), and ends the series of processes. In this manner, the band determining unit 214, in the band-to-be-used determining algorithm, primarily determines the band to be used based on policy information.

FIG. 14 is a diagram depicting an example of contents of the determination, by the band determining unit, of the band to be used. At step S902 depicted in FIG. 9, the band determining unit 214 determines the band to be used at the wireless base station 111, for example, as indicated by band-to-be-used determination contents 1400 depicted in FIG. 14. In the example depicted in FIG. 14, the band determining unit 214 determines the band to be used by the wireless base station 111 to be 20 [MHz] (2,100 to 2,120 [MHz]) of the I band.

FIG. 15 is a diagram depicting an example of a beacon transmitted in the second stage. At step S904 (second stage) depicted in FIG. 9, the band determining unit 214 generates and outputs to the beacon transmitting unit 216b, beacon information based on contents of the determination of the band to be used.

At step S906 (second stage) depicted in FIG. 9, the beacon transmitting unit 216b, based on the beacon information output from the band determining unit 214, for example, transmits a beacon 1500 depicted in FIG. 15 to neighbor wireless base stations. The beacon 1500 includes broadcast information indicating of the ASA bands (predetermined bands), the band that the wireless base station 111 uses in wireless communication and the priority of the operator of the wireless base station 111 in the ASA band.

For example, the beacon 1500 includes, as information elements, the target area, the time period, the configuration time, the frequency band to be used, the bandwidth utilization right, the current bandwidth used, and operator operation information. The target area and time period are information indicating the area and time period that the wireless base station 111 uses the ASA band and, for example, is obtained from the policy information received from the ASA managing apparatus 131. The configuration time is information indicating the time at which the band to be used was determined. The frequency band to be used is information indicating the band (I band) that the wireless base station 111 uses. The bandwidth utilization right is information indicating the bandwidth of a license that the wireless base station 111 purchased and, for example, is obtained from the policy information received from the ASA managing apparatus 131.

The current bandwidth used is information indicating the bandwidth used by the wireless base station 111. When the wireless base station 111 does not use the ASA I band, the current bandwidth used is configured to be 0 [MHz] (offthe-air). The operator operation information includes information such as the operator name of the wireless base station 111, the priority of a purchased license, the band utilization rate, the system utilization rate, and the like. The band utilization rate is a ratio (e.g., percentage) of the maximum band of the wireless base station 111 to the band in-use of the wireless base station 111. The system utilization rate is a ratio (e.g., percentage) of the number of terminals that can be accommodated by the wireless base station 111 to the number of terminals accommodated by the wireless base station 111.

The beacon transmitting unit 216b sets the transmission power value of the beacon 1500, for example, as the transmission power value (10 [dBm]) of a radio signal used for ASA by the wireless communications unit 215 of the wireless base station 111, as indicated by the measurement results 1100 of band information depicted in FIG. 11.

In this manner, each of the wireless base stations of the wireless access system 100 transmits a beacon that includes broadcast information indicating of the ASA bands (predetermined bands), the band used by the wireless base station for wireless communication, and the priority of the operator of the wireless base station in the ASA band. As a result, wireless base stations of differing operators are able to mutually confirm the priority and bands to be used, and cooperate.

FIG. 16 is a diagram depicting an example of contents of the determination of the band to be used, in the second stage. The band determining unit 214, for example, at step S907 (second stage) depicted in FIG. 9, for example, transmits determination contents 1600 of the determination of the band to be used depicted in FIG. 16 to the ASA managing apparatus 131, via the band utilization state transmitting unit 212. The determination contents 1600 are report information indicating the band used by the wireless base station 111, of the ASA bands (predetermined bands). The determination contents 1600, for example, are the same contents as that of the beacon 1500 depicted in FIG. 15.

FIG. 17 is sequence diagram of one example of processes in the third stage of the use case. In the third stage depicted at step S303 in FIG. 3, the apparatuses of the wireless access system 100, for example, execute the processes depicted in FIG. 17.

First, the beacon receiving unit 216a of the wireless base station 111 receives a beacon from a neighbor wireless base station. In the example depicted in FIG. 17, the beacon receiving unit 216a receives a beacon transmitted from the beacon transmitting unit 216b of the wireless base station 112 (step S1701). Next, the beacon receiving unit 216a outputs to the band determining unit 214, beacon information indicating contents of the beacon received at step S1701 (step S1702).

The band determining unit 214 executes the band-to-be-used determining algorithm based on the beacon information output at step S1702 (step S1703). At step S1703, for example, the band determining unit 214 causes the position/time measuring unit 213 to measure the position and time and obtains measurement results from the position/time measuring unit 213 (step S1703a). Further, the band determining unit 214 causes the band control unit 215a to measure band information and obtains measurement results from the band control unit 215a (step S1703b). Next, the band determining unit 214 causes the wireless measuring unit 215b to measure wireless information and obtains measurement results from the wireless measuring unit 215b (step S1703c).

The band determining unit 214 executes the band-to-be-used determining algorithm based on the policy information output at step S901 (second stage), the measurement results obtained at steps S1703a to S1703c, and the beacon information. The band-to-be-used determining algorithm at step S1703 will be described hereinafter. Steps S1704 to S1708 depicted in FIG. 17 are the same as steps S903 to S907 depicted in FIG. 9.

FIG. 18 is a diagram depicting an example of aggregation results of beacons received from neighbor wireless base stations. At step S1701 depicted in FIG. 17, the beacon receiving unit 216a of the wireless base station 111 receives beacons from neighbor wireless base stations. At step S1702 depicted in FIG. 17, the band determining unit 214 aggregates contents of the beacons received from neighbor wireless base stations, for example, like aggregation results 1800 depicted in FIG. 18.

Figure 19:
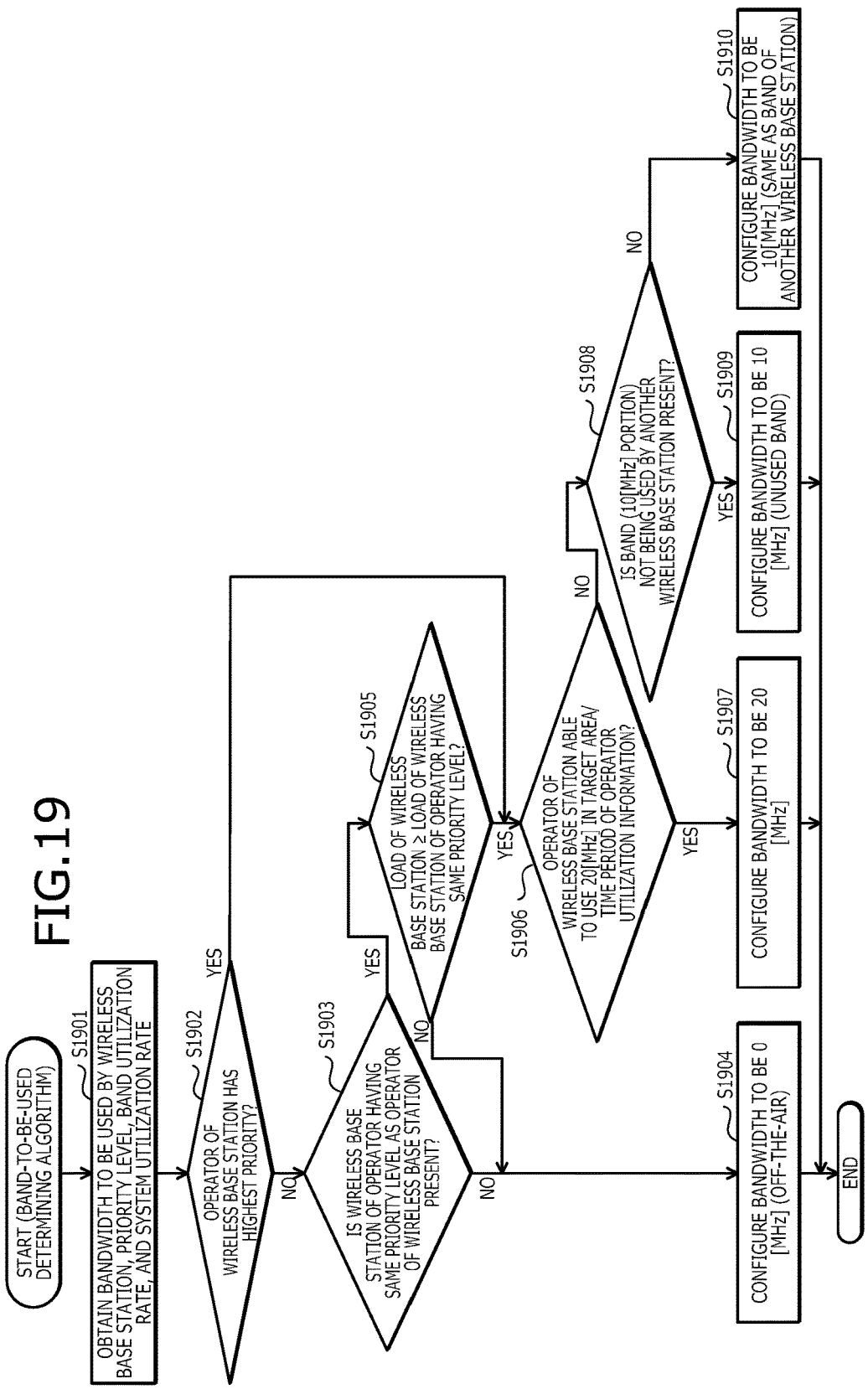
FIG. 19 is a flowchart of an example of the band-to-be-used determining algorithm in the third stage.

FIG. 19 is a flowchart of an example of the band-to-be-used determining algorithm in the third stage. At step S1703 depicted in FIG. 17, the band determining unit 214 executes, as the band-to-be-used determining algorithm, for example, steps depicted in FIG. 19.

First, the band determining unit 214 obtains the bandwidth to be used by the wireless base station 111, the priority level, the band utilization rate, and the system utilization rate (step S1901). These pieces of information, for example, may be obtained from measurement results obtained at steps S1703b, S1703c and the policy information received from the ASA managing apparatus 131 in the second stage.

Next, the band determining unit 214 judges whether the priority level of the operator (the operator of the wireless base station 111) has the highest priority among the wireless base stations using the band (I band) used by the wireless base station 111 in the area of the wireless base station 111 and the current time period (step S1902). The judgment at step S1902 may be performed based on beacons (e.g., the aggregation results 1800 in FIG. 18) from neighbor wireless base stations. The area of the wireless base station 111 and the current time period may be obtained from information (latitude, longitude, and time) of the position/time measuring unit 213. The band used by the wireless base station 111 may be obtained from the policy information received from the ASA managing apparatus 131. The priority level, for example, is the level of the priority of the purchased license. When the priorities of the purchased licenses are identical, the width of the bandwidth of licenses may be used to judge priority.

At step S1902, when the operator of the wireless base station 111 has the highest priority level (step S1902: YES), the band determining unit 214 transitions to step S1906. When the operator of the wireless base station 111 does not have the highest priority level (step S1902: NO), i.e., an operator having a higher priority level than that of the operator of the wireless base station 111 is present, the band determining unit 214 transitions to step S1903. In other words, the band determining unit 214 judges whether among the wireless base stations using the band (I band) used by the wireless base station 111 in the area of the wireless base station 111 and the current time period, a wireless base station of an operator having the same priority level as the operator of the wireless base station 111 is present (step S1903). The same priority level, for example, means that the priority levels described above are the same.

At step S1903, when no wireless base station of an operator having the same priority level as the operator of the wireless base station 111 is present (step S1903: NO), the band determining unit 214 configures the bandwidth to be 0

[MHz] (off-the-air) (step S1904), ending the series of processes. In this case, for example, the wireless base station 111 performs wireless communication using a dedicated band assigned to the wireless base station 111, without performing wireless communication using the I band for ASA.

At step S1903, when a wireless base station of an operator having the same priority level as the operator of the wireless base station 111 is present (step S1903: YES), the band determining unit 214 judges if the load of the wireless base station 111 is higher than or equal to the load of the wireless base station of the operator having the same priority level (step S1905). At step S1905, for example, the band determining unit 214, when the band utilization rate of the wireless base station is equal to the band utilization rate of another wireless base station or higher, judges that the load of the wireless base station 111 is the load of another wireless base station or higher. Alternatively, the band determining unit 214, when the system utilization rate of the wireless base station 111 is the system utilization rate of another wireless base station or higher, may judge that the load of the wireless base station 111 is the load of another wireless base station or higher. Alternatively, the band determining unit 214, when the band utilization rate of the wireless base station 111 is the band utilization rate of another wireless base station or higher and the system utilization rate of the wireless base station 111 is the system utilization rate of another wireless base station or higher, may judge that the load of the wireless base station 111 is the load of another wireless base station or higher.

The band utilization rate and system utilization rate of the wireless base station 111, for example, may be obtained from measurement results obtained by the wireless measuring unit 215b. The band utilization rate and system utilization rate of other wireless base stations, for example, may be obtained from operator operation information included in the beacons received from the other wireless base stations.

At step S1905, when the load of the wireless base station 111 is less than the load of a wireless base station of an operator having the same priority level as the operator of the wireless base station 111 (step S1905: NO), the band determining unit 214 transitions to step S1904 and configures the bandwidth to be 0 [MHz] (off-the-air).

At step S1905, when the load of the wireless base station 111 is equal to or higher than the load of a wireless base station of an operator having the same priority level as the operator of the wireless base station 111 (step S1905: YES), the band determining unit 214 judges whether the operator of the wireless base station 111 is able to use 20 [MHz] in the target area/time period of operator utilization information (step S1906).

At step S1906, when the operator of the wireless base station 111 is able to operate 20 [MHz] (step S1906: YES), the band determining unit 214 configures the bandwidth to be 20 [MHz] (step S1907), ending the series of processes.

At step S1906, when the operator of the wireless base station 111 is not able to operate 20 [MHz] (step S1906: NO), the band determining unit 214 judges whether a band (e.g., a 10 [MHz] portion) not used by another wireless base station is present (step S1908).

At step S1908, when a band not used by another wireless base station is present (step S1908: YES), the band determining unit 214 configures the bandwidth to be 10 [MHz] in the band not used (step S1909), ending the series of processes.

At step S1908, when a band not used by another wireless base station is not present (step S1908: NO), the band determining unit 214 configures the bandwidth to be 10 [MHz] in a band being used at another wireless base station (step S1910), ending a series of operations.

In this manner, the band determining unit 214, when a wireless base station of an operator having a higher priority level than that of the operator of the wireless base station 111 is present, configures the band to be used by the wireless base station 111 to be 0 [MHz] (off-the-air state). Further, the band determining unit 214, when no operator having a higher priority level than that of the operator of the wireless base station 111 is present, continues to use the band.

The band determining unit 214, when a wireless base station of an operator having a higher priority level than that of the operator of the wireless base station 111 is present and a wireless base station of an operator having the same priority level as the operator of the wireless base station 111 is present, compares the band utilization rates and/or the system utilization rates. The band determining unit 214, based on the comparison result, continues to use the band when the load of the wireless base station 111 is higher than or equal to the other loads. Further, when another wireless base station is present that has a load higher than that of the wireless base station 111, the band determining unit 214 configures the band to be used to be 0 [MHz] (off-the-air state).

FIG. 20 is a diagram depicting an example of configuration of the band control unit. The band determining unit 214 causes the band control unit 215a to configure the bandwidth determined by the band-to-be-used determining algorithm depicted in FIG. 19, for example, to be like a bandwidth configuration example 2000 depicted in FIG. 20. The example depicted in FIG. 20 is an example in which, at step S1904 depicted in FIG. 19, the band determining unit 214 configures the bandwidth to be the 0 [MHz] (off-the-air) of the I band.

FIG. 21 is a diagram depicting an example of a beacon transmitted in the third stage. At step S1705 (third stage) depicted in FIG. 17, the band determining unit 214 generates and outputs to the beacon transmitting unit 216b, beacon information based on contents of the determination of the band to be used.

At step S1707 (third stage) depicted in FIG. 17, the beacon transmitting unit 216b transmits based on the beacon information output from the band determining unit 214, for example, a beacon 2100 depicted in FIG. 21, to neighbor wireless base stations. The format of the beacon 2100 is the same as the format of the beacon 1500 depicted in FIG. 15. The example depicted in FIG. 21 is an example in which the wireless base station 111, in area A and time period 1, transmits a beacon indicating that the I band is not to be used (off-the-air).

In the third stage, the beacon transmitting unit 216b sets the transmission power value of the beacon 2100, for example, to be the transmission power value (10 [dBm]) of a radio signal used for ASA by the wireless communications unit 215 of the wireless base station 111, indicated by the measurement results 1100 of the band information depicted in FIG. 11.

FIG. 22 is a diagram depicting an example of contents of the determination of the band to be used, in the third stage. The band determining unit 214, for example, at step S1708 (third stage) depicted in FIG. 17, for example, transmits determination contents 2200 depicted in FIG. 22 to the ASA managing apparatus 131, via the band utilization state transmitting unit 212. The determination contents 2200 are report information indicating the band to be used by the wireless base station 111, of the ASA bands (predetermined bands).

The determination contents 2200, for example, have the same contents as the beacon 2100 depicted in FIG. 21.

Figure 23:
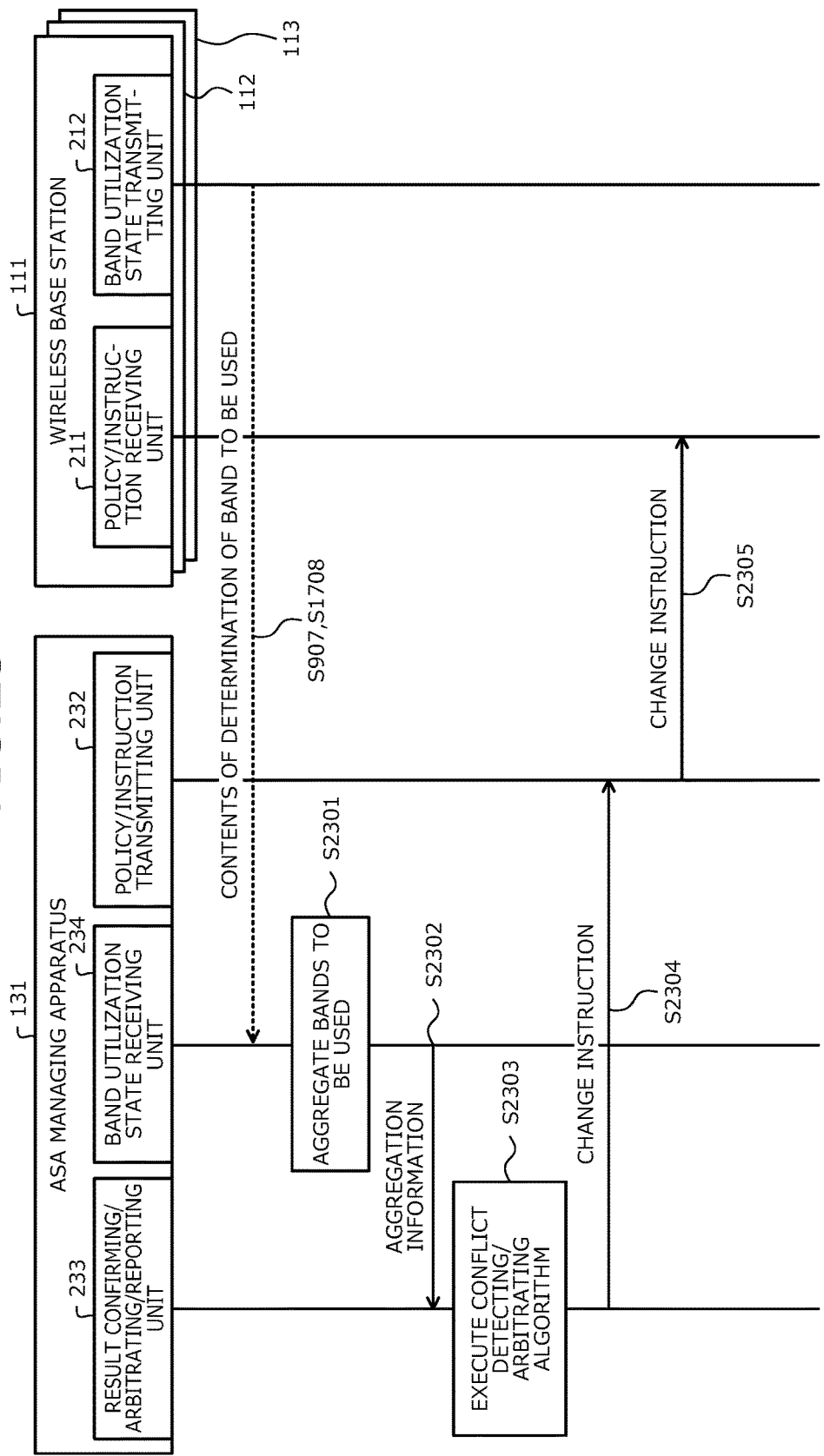
FIG. 23 is sequence diagram of one example of processes in a fourth stage of the use case.

FIG. 23 is sequence diagram of one example of processes in the fourth stage of the use case. In the fourth stage depicted at step S304 in FIG. 3, the apparatuses of the wireless access system 100, for example, execute steps depicted in FIG. 23.

The band utilization state receiving unit 234 of the ASA managing apparatus 131 receives contents of the determination of the band to be used, the contents being transmitted from the band utilization state transmitting units 212 of the wireless base stations 111 to 113 at step S907 of the second stage or at step S1708 of the third stage. The band utilization state receiving unit 234 aggregates the bands to be used by the wireless base stations 111 to 113 (step S2301). Next, the band utilization state receiving unit 234 outputs to the result confirming/arbitrating/reporting unit 233, aggregation information indicating results of the aggregation at step S2301 (step S2302).

The result confirming/arbitrating/reporting unit 233, based on the aggregation information output at step S2302, executes a conflict detecting/arbitrating algorithm described hereinafter (step S2303). The result confirming/arbitrating/reporting unit 233 outputs to the policy/instruction transmitting unit 232, a change instruction for the band to be used based on an implementation result of the conflict detecting/arbitrating algorithm at step S2303 (step S2304).

The policy/instruction transmitting unit 232 transmits to a target wireless base station among the wireless base stations 111 to 113, the change instruction output at step S2304 (step S2305), ending the series of processes in the fourth stage. The change instruction transmitted at step S2305 is received by the policy/instruction receiving unit 211 of the target wireless base station among the wireless base stations 111 to 113.

FIG. 24 is a diagram depicting an example of aggregation information. At step S2302 depicted in FIG. 23, the band utilization state receiving unit 234, for example, outputs aggregation information 2400 depicted in FIG. 24 to the result confirming/arbitrating/reporting unit 233. The aggregation information 2400 is information aggregating contents of the determination of the band to be used (e.g., FIG. 22) transmitted from the band utilization state transmitting units 212 of the wireless base stations 111 to 113. The reception time of the aggregation information 2400 is the time when the ASA managing apparatus 131 receives the contents of the determination of the band to be used.

Figure 25:
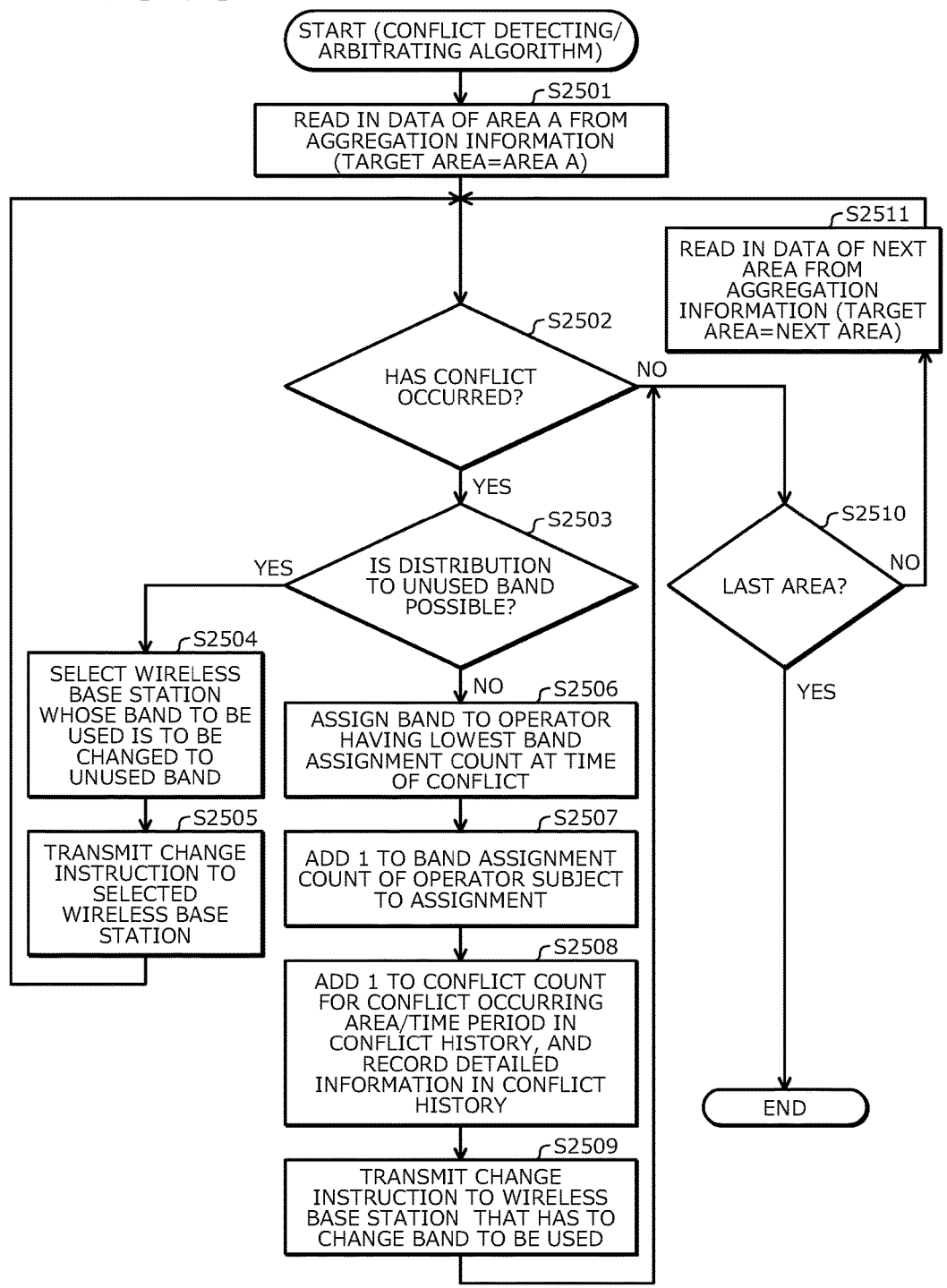
FIG. 25 is a flowchart of an example of a conflict detecting/arbitrating algorithm.

FIG. 25 is a flowchart of an example of the conflict detecting/arbitrating algorithm. At step S2303 depicted in FIG. 23, the result confirming/arbitrating/reporting unit 233, for example, as the conflict detecting/arbitrating algorithm, for example, executes steps depicted in FIG. 25. First, the result confirming/arbitrating/reporting unit 233 configures the target area of arbitration to be area A and reads in data of area A from the aggregation information output from the band utilization state receiving unit 234 (step S2501).

Next, the result confirming/arbitrating/reporting unit 233 judges whether in the target area, conflict is occurring (step S2502). For example, the result confirming/arbitrating/reporting unit 233, may judge that conflict is occurring when in the target area, wireless base stations of the same band to be used and time period are present. The bands to be used, for example, may be obtained from the used frequency band and the current bandwidth used fields in the aggregation information 2400 depicted in FIG. 24.

At step S2502, when conflict is not occurring (step S2502: NO), the result confirming/arbitrating/reporting unit 233 transitions to step S2510. When conflict is occurring (step S2502: YES), the result confirming/arbitrating/reporting unit 233 judges whether distribution to an unused band is possible (step S2503). For example, when conflict is occurring in the same 10 [MHz] bandwidth, the result confirming/arbitrating/reporting unit 233 judges that distribution is possible when other available 10 [MHz] bandwidth (unused band) is present.

At step S2503, when distribution to an unused band is possible (step S2503: YES), the result confirming/arbitrating/reporting unit 233 transitions to step S2504. In other words, the result confirming/arbitrating/reporting unit 233 selects from among wireless base stations at which conflict is occurring, a wireless base station whose band to be used is to be changed to an unused band (step S2504).

Next, the result confirming/arbitrating/reporting unit 233 transmits to the wireless base station selected at step S2504, a change instruction instructing the band to be used to be changed to an unused band, the change instruction being transmitted via the policy/instruction transmitting unit 232 (step S2505), and the result confirming/arbitrating/reporting unit 233 returns to step S2502.

At step S2503, when distribution to an unused band is not possible (step S2503: NO), the result confirming/arbitrating/reporting unit 233 assigns a band to the wireless base station of the operator having the lowest band assignment count at the time of conflict (step S2506).

At step S2506, for example, the result confirming/arbitrating/reporting unit 233 obtains the band assignment counts of the operators of the wireless base stations at which conflict is occurring. The result confirming/arbitrating/reporting unit 233, among the wireless base stations at which conflict is occurring, selects the wireless base station of the operator having the lowest obtained band assignment count to be the wireless base station that is to use the band in which conflict is occurring.

Next, the result confirming/arbitrating/reporting unit 233 adds 1 (increments) the band assignment count of the operator subject to the assignment at step S2506 (step S2507). Next, the result confirming/arbitrating/reporting unit 233 adds 1 to (increments) a conflict count for a conflict occurring area/time period in conflict history described hereinafter, and records detailed information in the conflict history (step S2508).

Next, the result confirming/arbitrating/reporting unit 233 transmits a change instruction, via the policy/instruction transmitting unit 232, to the wireless base station that has to change the band to be used (step S2509). The wireless base station that has to change the band to be used is a wireless base station that among the wireless base stations at which conflict is occurring, was not assigned (selected) at step S2506.

Next, the result confirming/arbitrating/reporting unit 233 judges whether the current target area is the last area among areas subject to arbitration (step S2510). When the current target area is not the last area (step S2510: NO), the result confirming/arbitrating/reporting unit 233 sets the target area to the next area and reads in data of the next area from the aggregation information output from the band utilization state receiving unit 234 (step S2511). The result confirming/arbitrating/reporting unit 233 then returns to step S2502. When the current target area is the last area (step S2510: YES), the result confirming/arbitrating/reporting unit 233 ends the series of processes.

As depicted in FIG. 25, the result confirming/arbitrating/reporting unit 233 detects and arbitrates a case (conflict) where the same band is used between neighbor wireless base stations. Here, an arbitration method has been described where when conflict occurs, the operator having the lowest band assignment count is assigned a band, however, the arbitration method is not limited hereto. For example, an arbitration method may be used in which the operator having the highest total license purchase amount is preferentially assigned a band.

In this manner, the ASA managing apparatus 131, based on the contents of the determination of the band to be used (report information) transmitted from wireless base stations of differing communication schemes and/or operators, detects overlap (conflict) of a band used by the wireless base stations. The ASA managing apparatus 131, when detecting the overlap, performs arbitration by controlling at least one of the wireless base stations to resolve the overlap. As a result, interference between wireless base stations of differing communication schemes and/or operators may be avoided.

Figure 26:
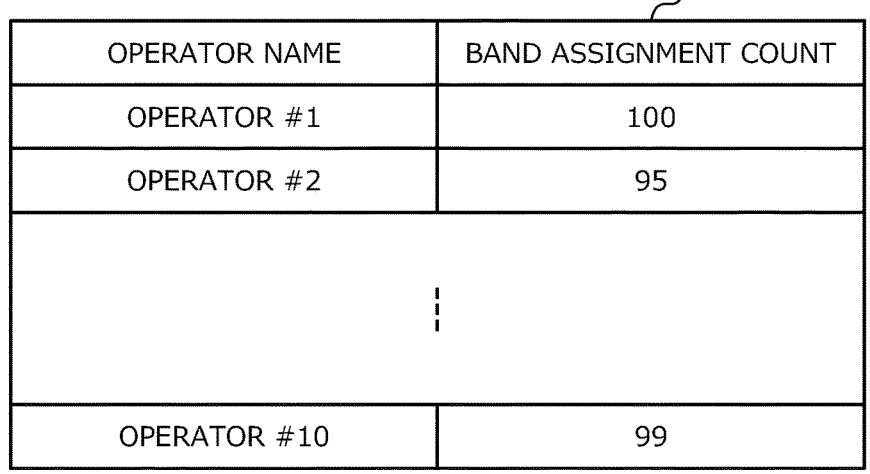
FIG. 26 is a diagram depicting an example of assignment history.

FIG. 26 is a diagram depicting an example of assignment history. The result confirming/arbitrating/reporting unit 233, as assignment history, for example, stores assignment history 2600 depicted in FIG. 26. The assignment history 2600 includes, as information elements, operator names and band assignment counts. The operator names are information indicating the operators in the wireless access system 100. The band assignment count is information indicating that conflict has occurred at the wireless base station of a target operator and the number of times a band was assigned to the wireless base station.

For example, in the example depicted in the aggregation information 2400 of FIG. 24, in area B, conflict is occurring between the wireless base station #2-3 of operator #2 and the wireless base station #10-3 of operator #10. In this case, the result confirming/arbitrating/reporting unit 233, based on the assignment history 2600, assigns a band to the wireless base station #2-3 of operator #2 having the lowest band assignment count of the operators #2, #10. In this example, the assigned band is 20 [MHz] (entire band) of the I band.

FIG. 27 is a diagram depicting an example of conflict history. The result confirming/arbitrating/reporting unit 233, for example, stores conflict history 2700 depicted in FIG. 27. The conflict history 2700 indicates according to area and time period, the number of times conflict has occurred in the wireless access system 100. For example, the conflict history 2700 includes, as information elements, target areas, time periods, conflict counts, and detailed information.

At step S2508 depicted in FIG. 25, the result confirming/arbitrating/reporting unit 233, for example, of the conflict history 2700 depicted in FIG. 27, increments the conflict count corresponding to the target area and time period at which conflict occurred.

Further, at step S2508 depicted in FIG. 25, the result confirming/arbitrating/reporting unit 233, for example, of the conflict history 2700 depicted in FIG. 27, records detailed information corresponding to the target area and time period at which conflict occurred. The detailed information includes the bands in which conflict occurred, bandwidth utilization rights, and operator operation information. The operator operation information is information included in a beacon received from a target wireless base station and, for example, includes the priority of the license, the band utilization rate, and the system utilization rate.

FIG. 28 is a diagram depicting an example of aggregation information of bands to be used. The result confirming/arbitrating/reporting unit 233 stores, as aggregation information of bands to be used by the wireless base stations 111 to 113, for example, aggregation information 2800 depicted in FIG. 28. The aggregation information 2800, for example, is the same as the aggregation information 2400 depicted in FIG. 24, except that in the example depicted in FIG. 28, in the aggregation information 2400 depicted in FIG. 24, as an information item, used band history is included in place of the reception time.

The reception time is information indicating the time that the ASA managing apparatus 131 received the contents of the determination of the band to be used. The used band history is information indicating usage of a band in a corresponding target area and time period. For example, when the current band used is 0 [MHz] (off-the-air), the used band history is configured to "0" (no usage) and when the current band used is a value other than 0 [MHz], the used band history is configured to "1" (usage).

FIG. 29 is a diagram depicting an example of a change instruction for the band to be used. At step S2304 depicted in FIG. 23, the result confirming/arbitrating/reporting unit 233, for example, outputs change instruction 2900 depicted in FIG. 29 to the policy/instruction transmitting unit 232. The policy/instruction transmitting unit 232 transmits to the wireless base stations 111 to 113, the change instruction 2900 output from the result confirming/arbitrating/reporting unit 233. The change instruction 2900 includes, as information elements, target areas, operator names, wireless base station names, time periods, instruction times, used frequency bands, bandwidth utilization rights, and bandwidth-to-be-used instructions.

The instruction time, for example, is the transmission time of the change instruction 2900. The bandwidth-to-be-used instruction is information indicating, according to wireless base station, bandwidths that can be used in the used frequency band and time period, and the corresponding target area. For example, like the example in FIG. 24, in area B, conflict is assumed to occur between wireless base station #2-3 of operator #2 and the wireless base station #10-3 of operator #10 and the wireless base station #2-3 of operator #2 is assumed to be assigned a band.

In this case, the ASA managing apparatus 131 transmits the change instruction 2900 to, for example, the wireless base station #10-3 of operator #10 that has to change the band to be used. As a result, the wireless base station #10-3, in area B and time period 1, recognizes that the I band cannot be used, and may change the band to be used, suspend wireless communication, or the like.

A case in which the change instruction 2900 is transmitted to the wireless base station #10-3 of operator #10 that has to change the band to be used has been described. However, the ASA managing apparatus 131 may further transmit the same information as the change instruction 2900 to the wireless base station #2-3 of operator #2 not having to change the band to be used. As a result, the wireless base station #2-3, in area B and time period 1 confirms that the I band cannot be used. Further, the ASA managing apparatus 131, for example, may further transmit the same information as the change instruction 2900 to wireless base stations at which conflict occurred.

FIG. 30 is sequence diagram of one example of processes in the fifth stage of the use case. In the fifth stage depicted at step S305 in FIG. 3, the apparatuses of the wireless access system 100, for example, execute steps depicted in FIG. 30.

First, the result confirming/arbitrating/reporting unit 233 of the ASA managing apparatus 131 aggregates the bands to be used by the wireless base stations and aggregates the conflict counts (arbitration counts) (step S3001). Next, the result confirming/arbitrating/reporting unit 233 transmits to the licensing information server 132, aggregation information indicating results of the aggregations at step S3001 (step S3002). The processes at steps S3001, S3002, for example, are executed periodically. For example, at step S3002, the conflict history 2700 depicted in FIG. 27 and the aggregation information 2800 depicted in FIG. 28 are transmitted to the licensing information server 132.

Next, the licensing information server 132, for example, subdivides the purchasing conditions 500 depicted in FIG. 5 (step S3003). For example, based on the aggregation results of the conflict counts indicated by the aggregation information transmitted at step S3002, the licensing information server 132 subdivides a license condition having a conflict count that is a predetermined count or higher.

The licensing information server 132 transmits to the license bidding/settling terminals 142, 152, aggregation results of the bands to be used indicated by the aggregation information transmitted at step S3002 and the purchasing conditions subdivided at step S3003 (step S3004). The license bidding/settling terminals 142, 152 display to operators #1, #2, the aggregation results of the bands to be used and the subdivided purchasing conditions transmitted at step S3003.

FIG. 31 is a diagram depicting an example of subdivided purchasing conditions. At step S3003 depicted in FIG. 30, the licensing information server 132, for example, performs subdivision like purchasing conditions 3100 depicted in FIG. 31. In the purchasing conditions 3100, for example, with respect to the purchasing conditions 500 depicted in FIG. 5, a combination of time period 1 and area B for which a license condition having a conflict count higher than or equal to a predetermined count (e.g. 1) is subdivided.

For example, in the purchasing conditions 3100, concerning area B, time period 1 (5:00-12:00) depicted in FIG. 5 is subdivided into time period 1 (5:00-9:00) and time period 1.1 (9:00-12:00). As a result, the purchaser of the license for 5:00-12:00 in area B may be subdivided, enabling the occurrence of conflict to be suppressed. "Target" of the subdivision target in the purchasing conditions 3100 indicates that the corresponding license condition has been subdivided.

Here, although subdivision of a time related license condition has been described, other than time, the licensing information server 132 may perform subdivision of an area, bandwidth, priority, and the like. Further, the licensing information server 132 may increase the purchase price of a license condition for which the conflict count is higher than or equal to a predetermined count, or the like.

In this manner, the licensing information server 132 performs a process of changing (e.g., subdividing) purchasing conditions of ASA bands (predetermined bands), based on the occurrence history (the conflict history 2700) of overlapping (conflicting) use by wireless base stations. As a result, the purchase of a condition susceptible to conflict may be subdivided, enabling the occurrence of conflict to be suppressed.

Figure 32:
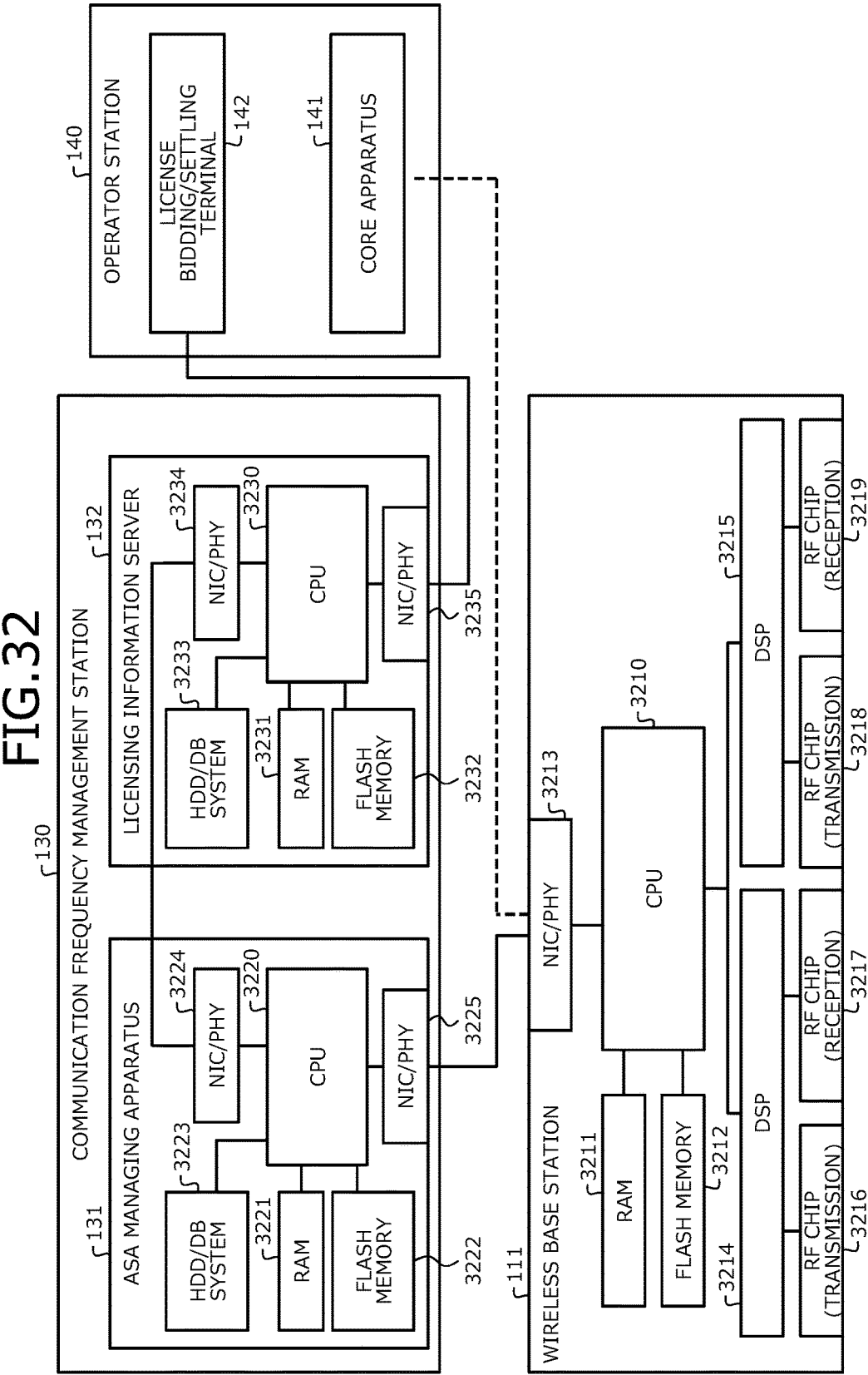
FIG. 32 is a diagram depicting an example of hardware of apparatuses.

FIG. 32 is a diagram depicting an example of hardware of the apparatuses. With reference to FIG. 32, hardware configuration of the wireless base station 111, the ASA managing apparatus 131, and the licensing information server 132 will be described. In FIG. 32, of the wireless base stations 111 to 113, the wireless base station 111 will be described, however, hardware configuration of the wireless base stations 112, 113 is the same as that of the wireless base station 111.

As depicted in FIG. 32, the wireless base station 111 has a central processing unit (CPU) 3210, random access memory (RAM) 3211, flash memory 3212, a network communications interface (NIC/PHY) 3213, digital signal processors (DSPs) 3214, 3215, and RF chips 3216 to 3219.

The CPU 3210 governs overall control of the wireless base station 111. The RAM 3211 is used as a work area of the CPU 3210. The flash memory 3212 stores various programs that cause the wireless base station 111 to operate. A program stored in the flash memory 3212 is loaded onto the RAM 3211 and executed by the CPU 3210. In place of the flash memory 3212, for example, non-volatile memory such as a magnetic disk, an optical disk, or the like may be used.

The network communications interface 3213 is a network interface card (NIC) of the physical (PHY) layer and communicates with the core apparatus 141 of the operator station 140 and the ASA managing apparatus 131 of the communication frequency management station 130, via the network 120 (refer to FIG. 1). The network communications interface 3213 is controlled by the CPU 3210.

The DSP 3214 controls the transmission and reception of data signals by the RF chips 3216, 3217. The RF chip 3216, under the control of the DSP 3214, performs a radio frequency (RF) transmission process of wirelessly transmitting data signals. The RF chip 3217, under the control of the DSP 3214, performs a RF reception process of wirelessly receiving data signals.

The DSP 3215 controls the transmission and reception of data signals by the RF chips 3218, 3219. The RF chip 3218, under the control of the DSP 3215, performs a RF transmission process of wirelessly transmitting data signals. The RF chip 3219, under the control of the DSP 3215, performs a RF reception process of wirelessly receiving data signals.

The policy/instruction receiving unit 211 and the band utilization state transmitting unit 212 depicted in FIG. 2, for example, may be realized by the CPU 3210 and the network communications interface 3213. The position/time measuring unit 213 depicted in FIG. 2, for example, may be realized by the DSP 3214 and the RF chip 3217, or by the DSP 3215 and the RF chip 3219. Alternatively, the position/time measuring unit 213 may be realized by a GPS unit.

The band determining unit 214 depicted in FIG. 2, for example, may be realized by the CPU 3210. The wireless communications unit 215 depicted in FIG. 2, for example, may be realized by the DSP 3214 and the RF chips 3216, 3217. The Passpoint wireless transmitting/receiving unit 216 depicted in FIG. 2, for example, may be realized by the DSP 3215 and the RF chips 3218, 3219.

As depicted in FIG. 32, the ASA managing apparatus 131 has a CPU 3220, RAM 3221, flash memory 3222, a HDD/DB system 3223, and network communications interfaces (NICs/PHY) 3224, 3225.

The CPU 3220 governs overall control of the ASA managing apparatus 131. The RAM 3221 is used as a work area of the CPU 3220. The flash memory 3222 stores various programs that cause the ASA managing apparatus 131 to operate. A program stored in the flash memory 3222 is loaded onto the RAM 3221 and executed by the CPU 3220. In place of the flash memory 3222, for example, non-volatile memory such as a magnetic disk, an optical disk, or the like may be used.

The HDD/DB system 3223 is a system that uses a hard disk drive (HDD) and stores various databases such as the wireless base station list 800, the assignment history 2600, the conflict history 2700, the aggregation information 2800 of bands to be used, and the like. In place of the HDD, for example, non-volatile memory such as a magnetic disk, flash memory, an optical disk, or the like may be used.

The network communications interface 3224 is a NIC of the physical (PHY) layer and communicates with the licensing information server 132. The network communications interface 3224 is controlled by the CPU 3220.

The network communications interface 3225 is a NIC of the physical (PHY) layer and communicates with the wireless base stations 111 to 113. The network communications interface 3225 is controlled by the CPU 3220.

The policy generating unit 231 and the result confirming/arbitrating/reporting unit 233 depicted in FIG. 2, for example, may be realized by the CPU 3220 and the network communications interface 3224. The policy/instruction transmitting unit 232 and the band utilization state receiving unit 234 depicted in FIG. 2, for example, may be realized by the CPU 3220 and the network communications interface 3225.

As depicted in FIG. 32, the licensing information server 132 has a CPU 3230, RAM 3231, flash memory 3232, a HDD/DB system 3233, and network communications interfaces (NICs/PHY) 3234, 3235.

The CPU 3230 governs overall control of the licensing information server 132. The RAM 3231 is used as a work area of the CPU 3230. The flash memory 3232 stores various programs that cause the licensing information server 132 to operate. A program stored in the flash memory 3232 is loaded onto the RAM 3231 and executed by the CPU 3230. In place of the flash memory 3232, for example, non-volatile memory such as a magnetic disk, an optical disk, or the like may be used.

The HDD/DB system 3233 is a system that uses a HDD and stores various databases such as the purchasing conditions 500, 3100, and the like. In place of the HDD, for example, non-volatile memory such as a magnetic disk, flash memory, an optical disk, or the like may be used.

The network communications interface 3234 is a NIC of the physical (PHY) layer and communicates with the ASA managing apparatus 131. The network communications interface 3234 is controlled by the CPU 3230.

The network communications interface 3235 is a NIC of the physical (PHY) layer and communicates with the license bidding/settling terminal 142 of the operator station 140. The network communications interface 3235 is controlled by the CPU 3230.

Figure 33:
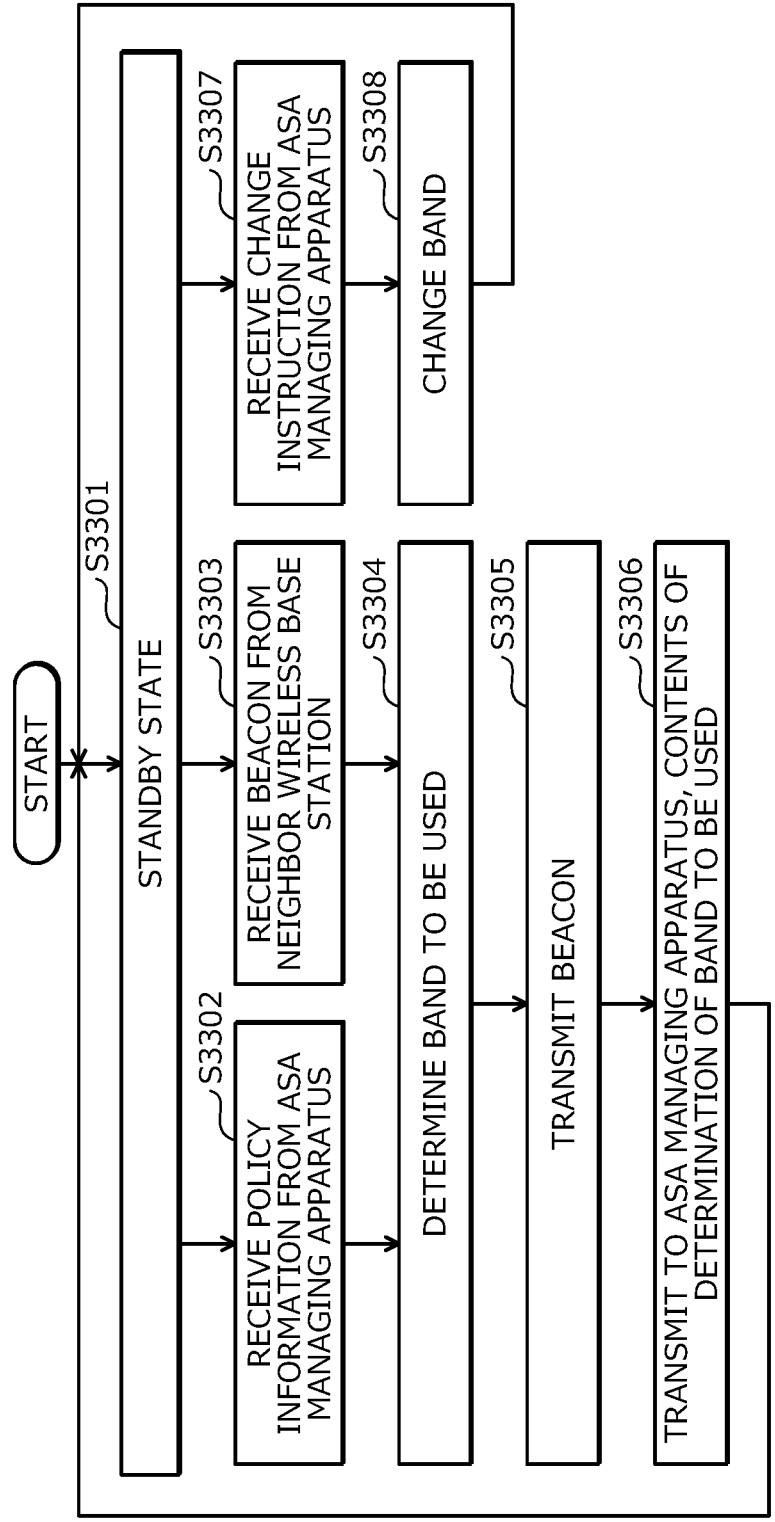
FIG. 33 is a flowchart of an example of a process by a wireless base station according to the embodiment.

FIG. 33 is a flowchart of an example of a process by the wireless base station according to the embodiment. The wireless base station 111 according to the embodiment, for example, executes steps depicted in FIG. 33. Here, description of a process by the wireless base station 111 will be described, however, a process of the wireless base stations 112, 113 is the same. First, the wireless base station 111 is in a standby state until a signal from another communications apparatus is received (step S3301).

At step S3301, when the wireless base station 111 receives policy information from the ASA managing apparatus 131 (step S3302), or receives a beacon from a neighbor wireless base station (step S3303), the wireless base station 111 transitions to step S3304.

In other words, the wireless base station 111 determines the band to be used in wireless communication thereof (step S3304). For example, when transitioning from step S3302 to step S3304, the wireless base station 111 determines the band to be used based on the policy information received at step S3302. When transitioning from step S3303 to step S3304, the wireless base station 111 determines the band to be used based on the beacon received from a neighbor wireless base station at step S3303.

Next, the wireless base station 111 wirelessly transmits to neighbor wireless base stations, a beacon indicating the band to be used as determined at step S3304 (step S3305). Next, the wireless base station 111 transmits to the ASA managing apparatus 131, contents of the determination of the band to be used as determined at step S3304 (step S3306), and returns to step S3301.

At step S3301, the wireless base station 111, when receiving from the ASA managing apparatus 131, a change instruction for the band to be used (step S3307), transitions to step S3308. In other words, based on the change instruction received at step S3307, the wireless base station 111 changes the band to be used in wireless communication thereof (step S3308), and returns to step S3301.

FIG. 34 is a flowchart of an example of a process by the ASA managing apparatus according to the embodiment. The ASA managing apparatus 131 according to the embodiment, for example, executes steps depicted in FIG. 34. First, the ASA managing apparatus 131 receives bid results (purchasing details) of operators from the licensing information server 132 (step S3401).

Next, the ASA managing apparatus 131 generates policy information based on the bid results received at step S3401 (step S3402). The ASA managing apparatus 131 transmits to wireless base stations (the wireless base stations 111 to 113), the policy information generated at step S3402 (step S3403).

Next, the ASA managing apparatus 131 receives from the wireless base stations, contents of the determination of the band to be used and aggregates the contents of the determination of the band to be used (step S3404). Step S3404, for example, is continuously performed for a certain period of time. Next, the ASA managing apparatus 131 executes the conflict detecting/arbitrating algorithm (step S3405).

The ASA managing apparatus 131, based on the implementation results of the conflict detecting/arbitrating algorithm at step S3405, transmits a change instruction for the band to be used to a wireless base station that is to change the band to be used (step S3406). Next, the ASA managing apparatus 131 transmits to the licensing information server 132, aggregation information indicating aggregation results of the bands to be used by the wireless base station and aggregation results of conflict counts (step S3407), and returns to step S3401.

As described, according to the embodiment, in ASA, the wireless base stations transmit and receive by beacons, the band to be used thereby and the priority that the operator thereof has for the band to be used and based on received beacons, may change the band to be used thereby. As a result, wireless base stations of differing operators cooperate and avoid interference on shared bands, enabling efficient management of shared bands.

As described, according to the wireless access system, efficient management of bands shared by multiple operators is enabled.

For example, recently, among mobile telephone services, not only have voice and web services increased, but the share of content requiring high-throughput such as the streaming of high-quality video, online games, and the like has increased. Therefore, the standards organization 3rd Generation Partnership Project (3GPP) has specified carrier aggregation as one standard of LTE-Advanced, realizing high-speed throughput using multiple bands (communication bands).

Nonetheless, in realizing carrier aggregation, multiple wide communication bands (about 10 [MHz] to 40 [MHz]) are necessary and with consideration of the utilization state of frequency bands in each country, the assignment of multiple effective communication bands to all operators is difficult.

Furthermore, concerning frequency assignment for mobile telephone services, often an auctioning scheme is used in the West and in some cases, operators are forced to make huge investments in order to obtain communication bands.

To solve such frequency problems (bands that can be used for LTE-Advanced are limited, and licensing costs are high), recently, ASA has been proposed in the West. As an example of ASA, for example, a scheme of using a portion of a 5 [GHz] band used for Wi-Fi, etc. is under investigation.

ASA has a merit of enabling exclusive use by multiple operators, however, the cooperation of other companies in band utilization, collection of utilization states for license cost calculations, and the like are necessary. One reason such agreement is necessary is, for example, Wi-Fi.

In other words, in public wireless LAN services run by operators, Wi-Fi communication band is unlicensed band and therefore, there is little investment in band and often public wireless LAN services are provided in abundance for the purpose of traffic offload. As a result, Wi-Fi access point interference between different companies is a problem. Control methods for interference between access points are not standardized and since the bands are not standardized, there is no motivation for operators to move their bands or reduce their bandwidths.

Further, as a communications scheme other than LTE, use of Wi-Fi (wireless LAN) is advancing. In particular, other than personal-use Wi-Fi access points, installation by operators, so-called deployment of public wireless LAN service is advancing.

Public wireless LAN service, for example, by an operator running a LTE service, is often performed for the purpose of offloading traffic and, switching of Wi-Fi and LTE service and smooth connection to a Wi-Fi access point have become problems.

In response to these problems, the Wi-Fi Alliance proposed and standardized Passpoint (formerly, Hotspot 2.0) (Hotspot is a registered trademark). Passpoint is specified for both wireless LAN terminals and Wi-Fi access points. Concerning Passpoint, a Wi-Fi access point gives notification of a service overview and state of the apparatus thereof by a beacon.

A wireless LAN terminal, based on the received beacon, performs authentication based on Universal Subscriber Identity Module (USIM) information. In the authentication based on USIM information, for example, Extensible Authentication Protocol-Subscriber Identity Module/Authentication and Key Agreement (EAP-SIM/AKA) may be used. As a result, the end user is saved from the burden of searching for the Wi-Fi access point and inputting an ID and/or password.

In the conventional technique above, for example, a problem arises in that ASA band management and cooperation between different operators and/or wireless schemes is difficult. For example, in a method of scanning neighbor Wi-Fi/LTE utilization states and determining band assignment, since cooperation between apparatuses and/or operators is not possible and arbitration is not performed, collisions of the bands to be used occur and interference occurs. Further, both LTE and Wi-Fi scanning apparatuses are necessary.

Further, with the conventional technique above, determination of additional purchasing, the calculation of license fees in accordance with band usage fees, etc. is difficult. For example, in a method of scanning neighbor Wi-Fi/LTE utilization states and determining band assignment, since there is no interface that reports the utilization states, the calculation of license fees is not possible. Further, as described above, since cooperation between apparatuses and/or operators is not possible, license management is difficult.

In contrast, according to the embodiment described, efficient ASA band management becomes possible.

For example, at a LTE base station, a communications interface for communication with the ASA managing apparatus 131 is provided, and by transmitting and receiving Passpoint beacons, frequency band coordination between wireless base stations is enabled. As a result, ASA band management and cooperation between different operators and/or wireless schemes (LTE and wireless LAN) becomes possible.

Further, the ASA managing apparatus 131, as a higher apparatus, is connected to the licensing information server 132 whereby traffic information and band utilization states of the operators are transmitted and received. As a result, determination of additional purchasing, the calculation of license fees in accordance with band usage fees, etc. become possible.

However, with the convention technique above, a problem arises in that wireless communication in which wireless base stations of different operators cooperate is difficult and therefore, efficient management of bands shared by multiple operators is not possible.

According to one aspect of the present invention, an effect is achieved in that efficient management of bands shared by multiple operators is enabled.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless access system in which a first operator and a second operator share a predetermined band, the wireless access system comprising:
    a first base station which belongs to the first operator, the first base station configured to transmit broadcast information indicating a priority of the first operator in the predetermined band; and
    a second base station which belongs to the second operator, the second base station configured to perform wireless communication using a band configured based on the broadcast information transmitted by the first base station and a priority of the second operator in the predetermined band.

2. The wireless access system according to claim 1 further comprising
    a server configured to transmit priority information based, on a purchasing status of the predetermined band for the first operator, the priority information indicating the priority of the first operator in the predetermined band, wherein the first base station configured to transmit the broadcast information, based on the priority information transmitted by the server.

3. The wireless access system according to claim 1, wherein the first base station transmits the broadcast information that indicates a ratio of maximum bands of the first base station to bands being used by the first base station, and the second base station performs wireless communication by the band configured based on the ratio of bands indicated by the broadcast information, and a ratio of maximum bands of the second base station to bands being used by the second base station.

4. The wireless access system according to claim 1 wherein the first base station transmits the broadcast information that includes a ratio of terminals that may be accommodated by the first base station to terminals that are being accommodated by the first base station, and the second base station performs wireless communication by the band configured based on the ratio of terminals indicated by the broadcast information, and a ratio of terminals that may be accommodated by the second base station to terminals that are being accommodated by the second base station.

5. The wireless access system according to claim 1, wherein the first base station transmits the broadcast information that indicates an area in which the first base station uses the predetermined band in wireless communication, and the second base station performs wireless communication by the band configured based on the area indicated by the broadcast information and position information indicating a position of the second base station.

6. The wireless access system according to claim 1, wherein the first base station and the second base station each transmits report information indicating a band used thereby of the predetermined band, and the wireless access system includes a server configured to control at least one of the first base station and the second base station, based on the report information transmitted by each of the first base station and the second base station, the server controlling at least one of the first base station and the second base station so as to resolve overlapping when the overlapping of bands used by the first base station and the second base station occurs.

7. The wireless access system according to claim 1 and including a server configured to perform a process of changing a purchasing condition of the predetermined band, based on an occurrence history of overlapping of bands used by the first base station and the second base station.

8. The wireless access system according to claim 1, wherein the first base station transmits the broadcast information that indicates of the predetermined band a band used by the first base station in wireless communication and the priority of the first operator in the predetermined band.

9. The wireless access system according to claim 1, wherein the first base station transmits the broadcast information by a beacon of a wireless local area network.

10. The wireless access system according to claim 1, wherein the first base station transmits the broadcast information that indicates the priority for each combination of a time period and an area in which wireless, communication is performed, and the second base station performs wireless communication by the band configured based on a priority that is indicated by the broadcast information and corresponds to the time period and the area in which the second base station performs wireless communication.

* * * * *